United States Patent
Iwai et al.

(10) Patent No.: US 9,615,237 B2
(45) Date of Patent: Apr. 4, 2017

(54) COMMUNICATION SYSTEM, DISTRIBUTION INFORMATION DETERMINATION DEVICE, COMMUNICATION METHOD, AND NON-TRANSITORY COMPUTER READABLE MEDIUM

(71) Applicant: NEC Corporation, Tokyo (JP)

(72) Inventors: Takanori Iwai, Tokyo (JP); Norio Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/775,520

(22) PCT Filed: Jan. 29, 2014

(86) PCT No.: PCT/JP2014/000449
§ 371 (c)(1),
(2) Date: Sep. 11, 2015

(87) PCT Pub. No.: WO2014/141575
PCT Pub. Date: Sep. 18, 2014

(65) Prior Publication Data
US 2016/0029193 A1    Jan. 28, 2016

(30) Foreign Application Priority Data

Mar. 13, 2013  (JP) .................................. 2013-050331

(51) Int. Cl.
*H04W 4/22*    (2009.01)
*H04W 4/06*    (2009.01)
(Continued)

(52) U.S. Cl.
CPC ............. *H04W 4/22* (2013.01); *H04L 12/189* (2013.01); *H04L 12/1895* (2013.01);
(Continued)

(58) Field of Classification Search
CPC ......... H04W 4/02; H04W 4/021; H04W 4/06; H04W 4/22; H04W 76/002; H04W 76/007; H04L 67/18; H04L 12/189; H04L 12/1895
(Continued)

(56) References Cited

U.S. PATENT DOCUMENTS 8,037,151 B1 * 10/2011 Daly ................... H04L 12/1895
709/207
8,838,064 B2 * 9/2014 Taylor ..................... H04W 4/02
455/404.1
(Continued)

FOREIGN PATENT DOCUMENTS

JP    2007-524308    8/2007
JP    2009-517738    4/2009
(Continued)

OTHER PUBLICATIONS

Y. Ichioka et al., "Urban Community Information System Using Simple Infrared Broadcasting Telecommunication Protocol", The Transactions of the Institute of Electronics, Information and Communication Engineers, vol. J84-B, No. 7, pp. 1299-1310, Jul. 2001.
(Continued)

*Primary Examiner* — Khawar Iqbal
(74) *Attorney, Agent, or Firm* — Finnegan, Henderson, Farabow, Garrett & Dunner, L.L.P.

(57) ABSTRACT

An object of the invention is to provide a communication system capable of broadcasting and distributing various types of messages. The communication system according to the present invention includes a network operator device (21) disposed in a network (20) managed by a carrier; and a distribution information determination device (30) disposed between the network operator device (21) and a plurality of application servers that provide an application service. The distribution information determination device
(Continued)

(30) transmits, to the network operator device (21), a distribution message transmitted from any one of application servers according to an event notification transmitted from a communication device (10_1), and a distribution policy used to distribute the distribution message, and distributes the distribution message to a plurality of communication devices (10_1) to (10_3) based on the distribution policy.

16 Claims, 16 Drawing Sheets

(51) Int. Cl.
*H04L 12/18* (2006.01)
*H04W 76/00* (2009.01)
(52) U.S. Cl.
CPC ........... *H04W 4/06* (2013.01); *H04W 76/002* (2013.01); *H04W 76/007* (2013.01)
(58) Field of Classification Search
USPC ........... 455/404.1–404.2, 414.1–414.4, 41.1, 455/456.1–456.6; 370/312
See application file for complete search history.

(56) References Cited

U.S. PATENT DOCUMENTS

| | | | | |
|---|---|---|---|---|
| 8,868,027 B2* | 10/2014 | Hall | ........................ | A63F 13/10 455/404.1 |
| 8,923,807 B2* | 12/2014 | Daly | ........................ | H04B 1/38 455/404.2 |
| 8,989,021 B2* | 3/2015 | Simon | ..................... | H04W 4/06 370/241 |
| 9,118,428 B2* | 8/2015 | Hall | ........................ | A63F 13/10 |
| 2005/0203673 A1* | 9/2005 | El-Hajj | .................. | G07C 5/008 701/1 |
| 2005/0261012 A1 | 11/2005 | Weiser | | |
| 2009/0288168 A1* | 11/2009 | Maghsoodnia | ....... | H04L 12/581 726/24 |
| 2011/0230202 A1* | 9/2011 | Wood | .................... | H04W 4/021 455/456.1 |
| 2012/0170451 A1* | 7/2012 | Viswanathan | ........ | H04W 4/005 370/230 |
| 2012/0252518 A1* | 10/2012 | Karampatsis | ......... | H04W 4/005 455/515 |
| 2013/0267192 A1* | 10/2013 | Sennett | ................ | G08B 27/006 455/404.1 |
| 2016/0007166 A1* | 1/2016 | Iwai | ........................ | H04W 4/06 370/312 |

FOREIGN PATENT DOCUMENTS

| | | | | |
|---|---|---|---|---|
| JP | 2010-39629 | | 2/2010 | |
| JP | 2010-45747 | | 2/2010 | |
| JP | 2012-185668 | | 9/2012 | |
| JP | 2012185668 | * | 9/2012 | ............... G08G 1/01 |

OTHER PUBLICATIONS

International Search Report mailed Apr. 22, 2014 in corresponding PCT International Application.

* cited by examiner

COMMUNICATION SYSTEM, DISTRIBUTION INFORMATION DETERMINATION DEVICE, COMMUNICATION METHOD, AND NON-TRANSITORY COMPUTER READABLE MEDIUM

CROSS-REFERENCE TO RELATED PATENT APPLICATIONS

This application is a National Stage Entry of International Application No. PCT/JP2014/000449, filed Jan. 29, 2014, which claims priority from Japanese Patent Application No. 2013-050331, filed Mar. 13, 2013. The entire contents of the above-referenced applications are expressly incorporated herein by referemce.

TECHNICAL FIELD

The present invention relates to a communication system, a distribution information determination device, a communication method, and a program, and more particularly, to a communication system, a distribution information determination device, a communication method, and a program for, for example, broadcast distribution.

BACKGROUND ART

In the case of distributing data to a plurality of communication devices, a data distributor distributes data using a broadcast distribution service provided in a network managed by a carrier. To achieve the broadcast distribution, techniques such as a broadcast service and a multicast service are used. In mobile communication networks, CBS (Cell Broadcast Service) is used to distribute emergency information. CBS is a service that notifies information by broadcasting to mobile phone terminals within a target area. Further, ETWS (Earthquake and Tsunami Warning System) is provided to meet the need for high-speed disaster notification and a flexible distribution area.

Patent Literature 1 discloses a configuration in which a distribution area is designated in a broader-area unit or a sector unit in the case of designating a distribution area for an emergency message.

CITATION LIST

Patent Literature

[Patent Literature 1] Japanese Unexamined Patent Application Publication No. 2010-45747

SUMMARY OF INVENTION

Technical Problem

Patent Literature 1 discloses a network configuration in which a message distribution station which has received a data distribution request from a flash report transmission station transmits an emergency distribution message. However, it is expected in the future that communication networks will broadcast and distribute not only messages related to emergency information, but also various types of messages. Thus, it is necessary to construct communication networks which will be able to broadcast and distribute distribution messages with different contents for each application server so that various types of messages can be broadcasted and distributed. In this regard, Patent Literature 1 discloses a network configuration capable of executing the distribution of messages requested by a specific flash report transmission station. However, Patent Literature 1 does not disclose any network configuration capable of distributing various types of messages requested by a plurality of different carriers and the like. Thus, Patent Literature 1 has a problem that it is impossible to broadcast and distribute distribution messages with different contents for each application server.

To solve the above-mentioned problem, an object of the present invention is to provide a communication system, a distribution information determination device, a communication method, and a program which are capable of broadcasting and distributing various types of messages.

Solution to Problem

A communication system according to a first exemplary aspect of the present invention includes: a network operator device disposed in a network managed by a carrier; and a distribution information determination device disposed between the network operator device and a plurality of application servers that provide an application service via the network, the distribution information determination device including a service policy determined by the plurality of application servers. The distribution information determination device determines, based on the service policy, a distribution message and a distribution policy to be transmitted to the network operator device, and transmits the determined distribution message and distribution policy to the network operator device. The network operator device distributes the distribution message to a plurality of communication devices based on the distribution policy transmitted from the distribution information determination device.

A distribution information determination device according to a second exemplary aspect of the present invention is disposed between a network operator device and an application server that provides an application service via a network managed by a carrier, the network operator device being disposed in the network, the distribution information determination device including: an information storage unit including a service policy determined by the application server; a distribution information determination unit that determines, based on the service policy, a distribution message and a distribution policy to be transmitted to the network operator device; and a communication unit that transmits the determined distribution message and distribution policy to the network operator device that distributes the distribution message to a plurality of communication devices based on the distribution policy.

A communication method according to a third exemplary aspect of the present invention is used in a distribution information determination device disposed between a network operator device and an application server that provides an application service via a network managed by a carrier, the network operator device being disposed in the network, the communication method including: determining a distribution message and a distribution policy to be transmitted to the network operator device based on a service policy determined by the application server; and transmitting the determined distribution message and distribution policy to the network operator device that distributes the distribution message to a plurality of communication devices based on the distribution policy.

A program according to a fourth exemplary aspect of the present invention causes a computer in a distribution information determination device to execute processing, the distribution information determination device being disposed between a network operator device and an application server that provides an application service via a network managed by a carrier, the network operator device being disposed in the network, the processing including the steps of: determining a distribution message and a distribution policy to be transmitted to the network operator device based on a service policy determined by the application server; and transmitting the determined distribution message and distribution policy to the network operator device that distributes the distribution message to a plurality of communication devices based on the distribution policy.

Advantageous Effects of Invention

According to the present invention, it is possible to provide a communication system, a distribution information determination device, a communication method, and a program which are capable of broadcasting and distributing various types of messages.

DESCRIPTION OF EMBODIMENTS (First Exemplary Embodiment)

Figure 1:
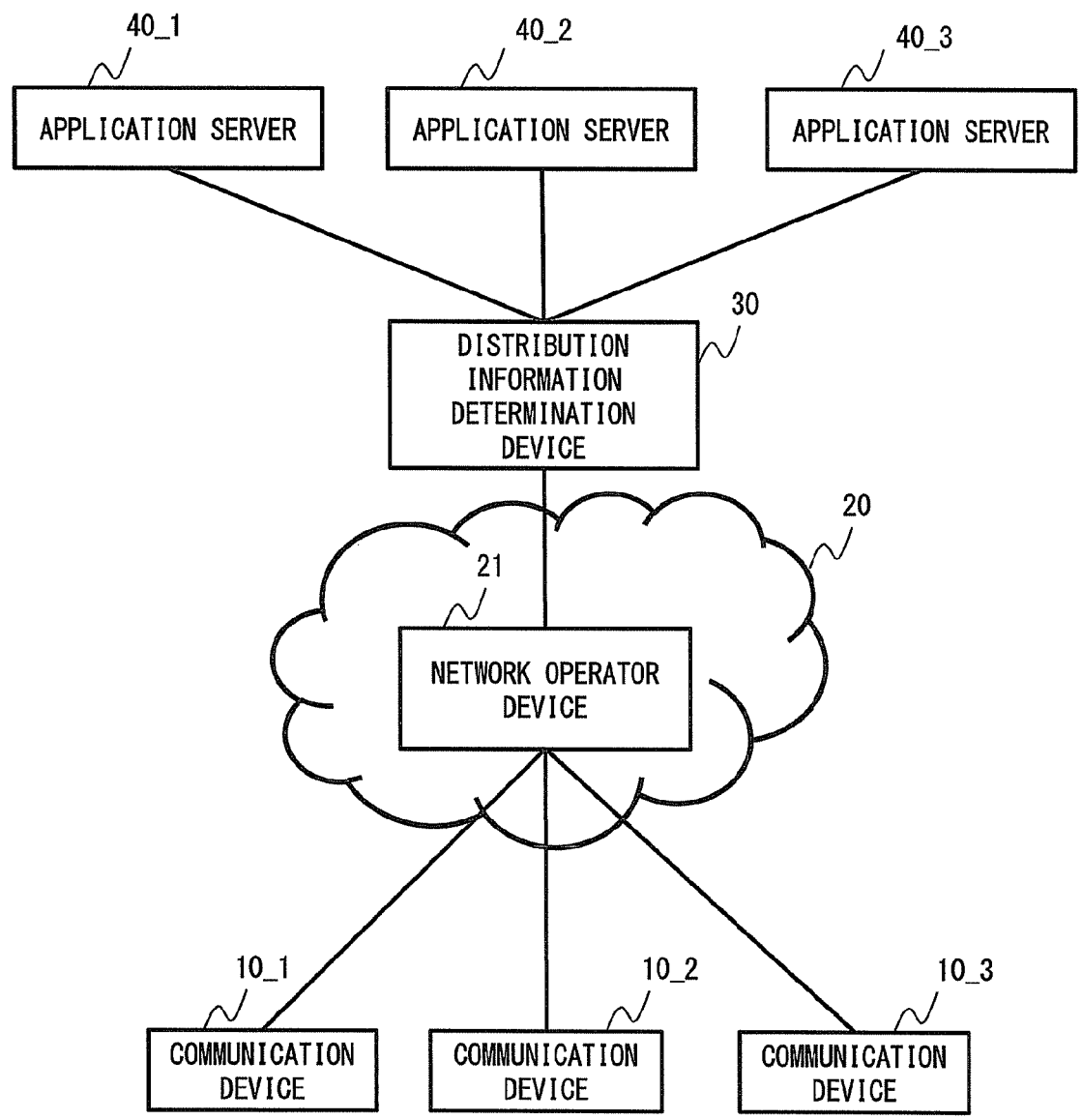
FIG. 1 is a block diagram showing a communication system according to a first exemplary embodiment.

Exemplary embodiments of the present invention will be described below with reference to the drawings. A configuration example of a communication system according to a first exemplary embodiment of the present invention will be described with reference to FIG. 1. The communication system includes communication devices 10_1 to 10_3, a network 20, a distribution information determination device 30, and application servers 40_1-40_3. The network 20 includes a network operator device 21.

The network operator device 21 is disposed in the network 20 which is managed by a carrier. The application servers 40_1 and 40_3 each provide a service to distribute a message to the communication devices 10_1 to 10_3, respectively, which are connected via the network 20.

The communication devices 10_1 to 10_3 may be, for example, mobile phone terminals, smartphone terminals, notebook personal computers, transportation means, such as automobiles or electric cars, with a communication function mounted thereon, or machines, such as clocks, which are worn by users and have a communication function mounted thereon. The communication devices 10_1 to 10_3 may also be devices having a communication function mounted thereon, such as vending machines or electrical household appliance, which are seldom moved. Alternatively, the communication devices 10_1 to 10_3 may be fixed telephones that perform communication via a fixed communication network. In still another alternative, the communication devices 10_1 to 10_3 may be terminal devices that perform communication via a wireless LAN, or terminal devices that perform near field communication using infrared-ray communication or other communication methods.

The distribution information determination device 30 is disposed between the network operator device 21 and the application servers 40_1 and 40_3. The distribution information determination device 30 includes service policies which are respectively determined by the application servers 40_1 and 40_3. The distribution information determination device 30 may receive the service policies respectively transmitted from the application servers 40_1 and 40_3, and may store the received service policies in a memory or the like within the distribution information determination device 30. While this figure shows that the distribution information determination device 30 is disposed outside of the network 20, the distribution information determination device 30 may be disposed within the network 20.

The service policy is information that defines the content of services provided by the application servers 40_1 and 40_3, service specifications, or the like. For example, the application server 40_1 may determine a service policy to the effect that when a traffic accident occurs, a message to urge vehicles traveling within a radius of one kilometer from the traffic accident site to slow down is distributed to the vehicles for a certain period of time, and may register the determined service policy in the distribution information determination device 30. The service policy is not limited to the above-mentioned specific example. Various contents may be defined as the service policy.

Based on the service policy, the distribution information determination device 30 determines a distribution message and a distribution policy to be transmitted to the network operator device 21. The distribution policy is information used for the network operator device 21 to distribute the distribution message to a plurality of communication devices. The distribution policy is information including at least one of a distribution area, a distribution target communication device, and a distribution period. For example, the distribution information determination device 30 specifies the traffic accident site and determines an area within a radius of one kilometer from the traffic accident site as the distribution area. Further, the distribution information determination device 30 may determine communication devices mounted on vehicles as distribution target communication devices, and may determine, as the distribution period, 30 minutes, for example, after the occurrence of the traffic accident. Thus, the distribution information determination device 30 determines the distribution policy to satisfy the service policy. Further, the distribution information determination device 30 generates or determines a message to urge vehicles to slow down, for example, as the distribution message that satisfies the service policy.

The distribution information determination device 30 transmits the determined distribution policy and distribution message to the network operator device 21.

The network operator device 21 transmits the distribution message based on the distribution policy transmitted from the distribution information determination device 30.

As described above, in the communication system shown in FIG. 1, the distribution information determination device 30 is connected to a plurality of application servers. Further, the distribution information determination device 30 can transmit different distribution policies to the network operator device 21 according to the service policies determined by the application servers.

Accordingly, the network operator device 21 can distribute various distribution messages to the plurality of communication devices connected to the network 20, according to various service policies determined by the application servers.

FIG. 1 illustrates a configuration in which three communication devices and three application servers are provided. However, the number of communication devices and the number of application servers are not limited to three. Also in the system configurations illustrated in FIGS. 2 to 17, the number of devices is not limited to the number of devices illustrated in the figures.

(Second Exemplary Embodiment)

Figure 2:
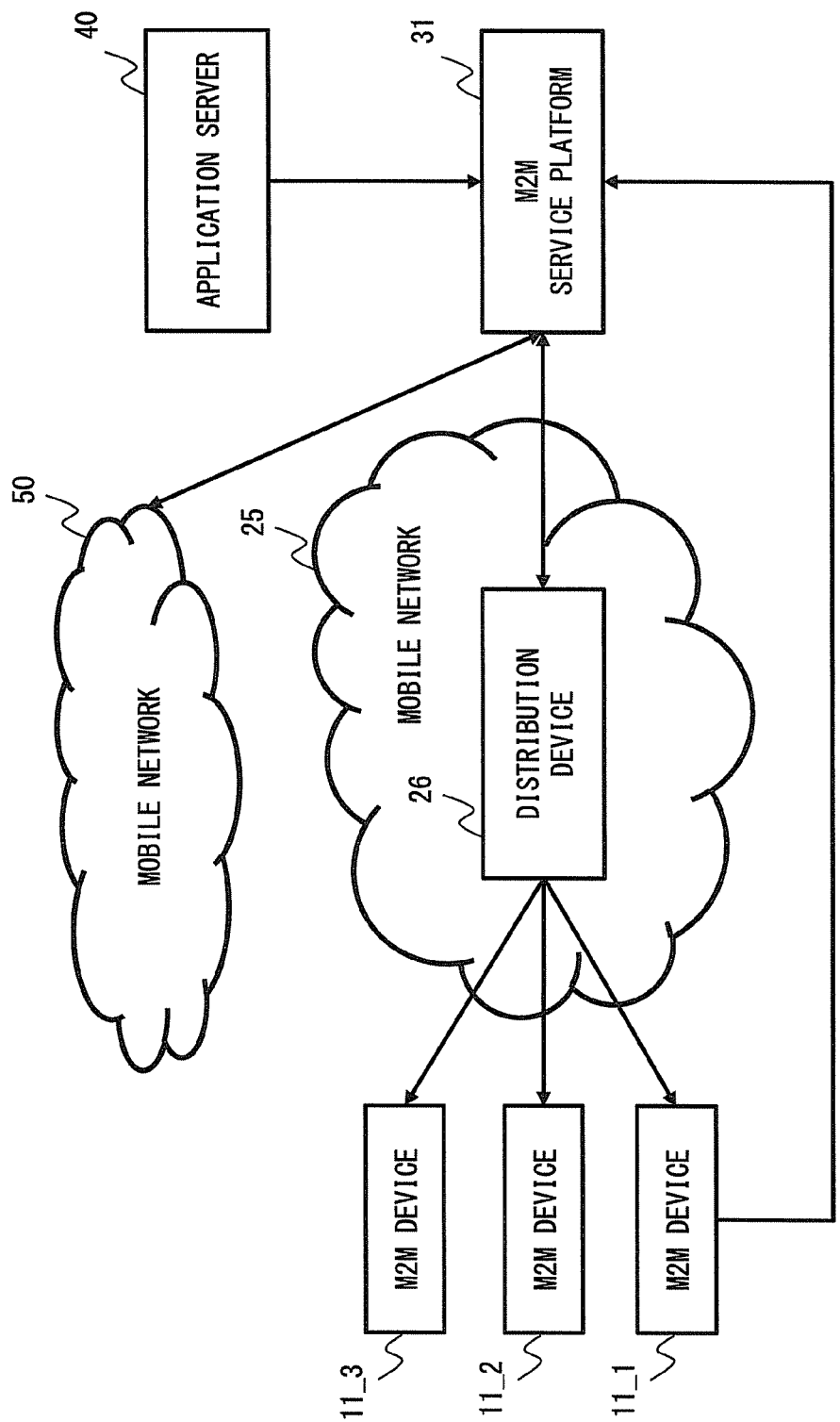
FIG. 2 is a block diagram showing a communication system according to a second exemplary embodiment.

Next, a configuration example of a communication system according to a second exemplary embodiment of the present invention will be described with reference to FIG. 2. FIG. 2 mainly illustrates M2M (Machine to Machine) communications. However, the present invention is not limited to the application of M2M communications, and can also be applied to general communications and the like. The communication system shown in this figure includes M2M devices 11_1 to 11_3, a mobile network 25, a mobile network 50, an M2M service platform (M2M service PF) PF 31, and an application server 40. The mobile network 25 includes a distribution device 26. The M2M devices 11_1 to 11_3 correspond to the communication devices shown in FIG. 1. The mobile networks 25 and 50 correspond to the network 20 shown in FIG. 1. The distribution device 26 corresponds to the network operator device 21 shown in FIG. 1. The M2M service PF 31 corresponds to the distribution information determination device 30 shown in FIG. 1.

The M2M devices 11_1 to 11_3 are, for example, devices that autonomously transmit data between the communication devices without the need for any user operation. Data autonomously transmitted from the M2M devices 11_1 to 11_3 to the M2M service PF 31 is referred to as, for example, event information. The event information includes information about, for example, the degree of severity of an event detected by each of the M2M devices 11_1 to 11_3, the location of the detected event, the time period of the detected event, or the number of detected events.

For example, when the M2M device 11_1 is an automobile, the M2M device 11_1 notifies the M2M service PF 31 of event information generated in the automobile. The event information generated in the automobile may be, for example, information about a traffic accident. The M2M device 11_1 may acquire the information about a traffic accident from a sensor provided in the automobile.

In the case of a traffic accident, for example, the degree of severity of the event detected by the M2M device 11_1 may be determined depending on the number of injured people. For example, two thresholds may be set using the number of people injured in the traffic accident. When the number of injured people is smaller than a first threshold, the degree of severity may be set to a low level. When the number of injured people is greater than the first threshold and smaller than a second threshold, the degree of severity may be set to a medium level. When the number of injured people is greater than the second threshold, the degree of severity may be set to a high level. Alternatively, the degree of severity may be determined depending on the content of the traffic accident. That is, if a vehicle crashes into an object on the road, the degree of severity may be set to the low level; if a vehicle crashes into a person, the degree of severity may be set to the medium level; and if a plurality of vehicles collide, the degree of severity may be set to the high level.

For example, the M2M device 11_1 may detect that, for example, an airbag has been operated, by using information output from a sensor. In this case, the M2M device 11_1 may notify the M2M service PF 31 of event information indicating that a traffic accident has occurred. Further, the M2M device 11_1 may detect information about what part of a vehicle has been damaged (for example, a front portion or a side portion of the vehicle) in the traffic accident, by using an acceleration sensor, and may notify the M2M service PF 31 of the information as event information. The M2M device 11_1 may determine the degree of severity of the event by using a plurality of pieces of sensor information.

When the M2M device 11_1 is an automobile, the size of a dangerous object may be determined using an in-vehicle camera or the like, and the degree of severity of the event may be determined depending on the size of the dangerous object. The M2M device 11_1 may also detect a collapse of a tunnel by using a sensor, an in-vehicle camera, or the like, and may transmit information about the degree of severity of the event.

When the M2M device 11_1 is used for a device other than an automobile, the M2M device 11_1 may detect a range of a power outage, a range of effects of a stroke of lighting, a range of disconnection of a power line, or the like, and the degree of severity of the event may be determined depending on the respective sizes of these ranges. Further, when the M2M device 11_1 can use information output from a temperature sensor, the degree of severity of the event may be determined depending on the detected temperature.

The M2M device 11_1 may also detect a range of leakage, an amount of leakage, or the extent of damage due to leakage caused by, for example, a depression in the road, and may determine the degree of severity of the event according to these pieces of information.

The M2M device 11_1 may also detect security information. For example, the M2M device 11_1 may determine the type of a crime, such as theft, molestation, snatch-and-run, robbery, murder, or indiscriminate killing, by using information detected by a sensor, information from witnesses, or the like, and may determine the degree of severity of the event according to the type of the crime.

The M2M device 11_1 may also detect a health condition of a user wearing the M2M device 11_1. For example, upon detecting fluctuations of the pulse, blood pressure, or body temperature of the user, the M2M device 11_1 may set the degree of severity to the low level. Upon detecting that the user is bleeding, the M2M device 11_1 may set the degree of severity to the medium level. Upon detecting that the user is unconscious, or has difficulty in breathing, for example, the M2M device 11_1 may set the degree of severity to the high level.

Additionally, when a fire occurs, the M2M device 11_1 may determine the degree of severity of the event depending on, for example, whether the fire has occurred in a single-family house or in a building, or the density of buildings in the vicinity of the fire scene.

As another example of the event information, the M2M device 11_1 may transmit GPS information about a location where an event has occurred, for example, a location where a traffic accident has occurred, to the M2M service PF 31, in the case of notifying about the location of the event.

The M2M device 11_1 may send a notification as event information as to whether the event has occurred in an urban area or a suburb. The M2M device 11_1 may also send a notification as event notification as to whether the event has occurred, for example, at a building or a single-family house, in a house or outside a house, or in the mountains or the sea. The M2M device 11_1 may also send a notification as event information about, for example, the floor of a building where the event has occurred, or the type of a store where the event has occurred. The M2M device 11_1 may also send a notification as event information as to whether the location where the event has occurred is on a sidewalk, a general road, or an expressway. The M2M device 11_1 may also send a notification as event information as to whether the location where the event has occurred is in a bus, in a train, or in a general vehicle. The M2M device 11_1 may also send a notification as event information about a country, a prefecture, a city, or the like in which the event has occurred.

In the case of transmitting the event information to the M2M service PF 31, the M2M device 11_1 may transmit the event information including information about the time when the event occurred. When the M2M device 11_1 collects pieces of event information from a plurality of other M2M devices and transmits the collected information to the M2M service PF 31, the M2M device 11_1 may transmit information about the number of collected events to the M2M service PF 31.

The M2M device 11_1 may transmit the event information to the M2M service PF 31 via the mobile network 25, or may transmit the event information to the M2M service PF 31 by a communication line different from the mobile network 25. The communication line different from the mobile network 25 may be, for example, the Internet connection via a wireless LAN.

The application server 40 is a device managed by an application service provider. The application service provider is, for example, a company that provides an application service. The application service provider may be a carrier different from a mobile carrier. In other words, the application server 40 may be disposed in a network managed by a management policy different from the management policy of the mobile communication network managed by the mobile carrier. The application server 40 determines a service policy and transmits the determined service policy to the M2M service PF 31.

The application server 40 may provide a broadcast service for distributing, for example, information related to a traffic accident. Specifically, the application server 40 may determine a service policy that when the M2M devices 11_1 to 11_3 detect the occurrence of a traffic accident, a message to urge vehicles travelling within a radius of one kilometer from the traffic accident site to slow down is distributed for a certain period of time. Further, the application server 40 may determine a service policy to distribute, for example, information about an alert level indicating the degree of severity and the degree of urgency of a traffic accident, information about a detour around the traffic accident site, or information about a traffic jam caused by the traffic accident.

The application server 40 may also determine a service policy as follows. For example, the application server 40 may transmit, to the M2M service PF 31, information that correlates the event information transmitted from the M2M devices 11_1 to 11_3 with the distribution policy transmitted from the M2M service PF 31 to the distribution device 26 as a service policy. Alternatively, the application server 40 may transmit, to the M2M service PF 31, information that correlates the distribution policy with a plurality of pieces of event information, such as information about the degree of severity of the event and the location where the event has occurred, which are included in the event information, as a service policy.

In another alternative, the application server 40 may transmit, to the M2M service PF 31, information about a distribution period and a distribution area for distributing the distribution message to the M2M devices 11_1 to 11_3, as a service policy. The application server 40 may also transmit, to the M2M service PF 31, a distribution interval or a distribution time and a group of distribution target devices as a service policy.

In still another alternative, the application server 40 may determine information about the total amount of payment to the carrier that manages the mobile network 25, and may transmit, to the M2M service PF 31, information to instruct distribution of the distribution message within the range of the total amount of payment, as a service policy.

The M2M service PF 31 is connected to a plurality of networks. For example, FIG. 2 illustrates an example in which the M2M service PF 31 is connected to both the mobile network 25 and the mobile network 50. The M2M service PF 31 may be connected to a fixed communication network or the like different from the mobile network. The mobile network 25 and the mobile network 50 may be networks managed by different carriers. In another alternative, the mobile network 25 and the mobile network 50 may be networks that distribute data using different communication methods. For example, the mobile network 25 and the mobile network 50 may be networks such as 2G/3G/LTE as specified in the 3GPS, or may be a PHS network, a Wimax network, a wireless LAN, or the like.

The M2M service PF 31 is, for example, a group of devices that are managed by an M2M service provider. Accordingly, the M2M service PF 31 may be composed of a plurality of server devices or a single server device. The M2M service may be, for example, the broadcast service provided to the M2M devices.

The M2M service provider may be a carrier different from the mobile carrier and the application service provider. In other words, the M2M service PF 31 may be disposed in a network managed by a management policy different from that of networks managed by the application service provider and the mobile carrier. The M2M service provider and the application service provider may be the same carrier, and the M2M service PF 31 and the application server 40 may be disposed in a network managed based on the same management policy. Alternatively, the M2M service provider and the mobile carrier may be the same carrier, and the M2M service PF 31 and the distribution device 26 may be disposed in the mobile network 25 managed based on the same management policy. In still another alternative, the M2M service provider, the mobile carrier, and the application service provider may be the same carrier, and the M2M service PF 31, the application server 40, and the distribution device 26 may be disposed in a network managed based on the same management policy.

The M2M service PF 31 receives the service policy transmitted from the application server 40. Further, the M2M service PF 31 receives the event information transmitted from at least one of the M2M devices 11_1 to 11_3. FIG. 2 illustrates an example in which the M2M service PF 31 receives the event information transmitted from the M2M device 11_1. The M2M service PF 31 uses the event information to determine the distribution message and the distribution policy to be distributed to the distribution device 26. For example, the M2M service PF 31 may include an information table that correlates the event information with the distribution message and the distribution policy. Upon receiving the event information, the M2M service PF 31 may specify the distribution message and the distribution policy that correspond to the received event information, by using the information table. In this case, the distribution message and the distribution policy are determined so as to satisfy the service policy determined by the application server 40. The distribution message may also be referred to as an alert message, depending on the content of the received distribution message.

The distribution policy includes, for example, a distribution area, a distribution target device, a priority, or a distribution period. In this case, the M2M service PF 31 may change and rewrite the content set in the distribution policy according to the event information. The distribution policy is information which can be changed, and may also be referred to as a distribution parameter, distribution control information, or the like. On the other hand, the service policy is information determined by the application server 40, and cannot be rewritten by the M2M service PF 31. The service policy is changed by the application server 40. Upon receiving the changed service policy from the application server 40, the M2M service PF 31 updates the service policy by discarding the existing service policy, or by overwriting the existing service policy.

The M2M service PF 31 may change the distribution area according to the degree of severity of the event information. For example, when the degree of severity is low, the M2M service PF 31 may set a small distribution area; when the degree of severity is high, the M2M service PF 31 may set a large distribution area; and when the degree of severity is medium, the M2M service PF 31 may set an intermediate distribution area between the small distribution area and the large distribution area.

Further, the M2M service PF 31 may change the distribution area according to the information about the location notified in the event information. For example, in a case where the event has occurred in an urban area, the M2M service PF 31 may set a small distribution area because the population density in the urban area is high. In a case where the event has occurred in a suburb, the M2M service PF 31 may set a large distribution area because the population density in the suburb is low. The distribution area may be changed depending on whether, for example, the event has occurred in a house or outside a house.

The distribution target device may be, for example, a communication device mounted on a vehicle as a distribution target of the distribution message. The M2M service PF 31 may select one of an M2M device, such as a vehicle or an electronic message board, and a non-M2M device, such as a smartphone, as a distribution target device. In a case where the event has occurred on an expressway, the M2M service PF 31 may determine vehicles traveling on the expressway as distribution target devices. In a case where the event has occurred on a general road, the M2M service PF 31 may determine communication devices owned by pedestrians and vehicles traveling on the general road as distribution target devices.

Further, when the distribution target devices are divided into groups, the M2M service PF 31 may specify a group of distribution target devices. For example, the groups may be defined for each contracted company, or according to the type of common terminals such as the M2M device or the non-M2M device.

Further, the M2M service PF 31 may change the priority according to the degree of severity in the event information. For example, the M2M service PF 31 may set a longer allowable delay as the degree of severity in the event information decreases. The M2M service PF 31 may also change the amount charged to the application server 40 according to the degree of severity in the event information.

Furthermore, the M2M service PF 31 may change the priority according to the location where the event has occurred. For example, in a case where the event has occurred in a suburb, the M2M service PF 31 may set the distribution priority to a low level because the population density in the suburb is low. In a case where the content of the event indicates information about a power outage and the power outage has occurred in buildings and single-family houses, the M2M service PF 31 may set the distribute priority to a high level because the effect of the power outage in the buildings is greater than that in the single-family houses.

The distribution policy may include, for example, information indicating whether or not to repeatedly distribute the distribution message, an interval period between a distribution of the distribution message and a repeat thereof, or a state indicating that the distribution has been stopped. The distribution policy may also be referred to as an alert parameter.

Furthermore, the M2M service PF 31 may change the content of the distribution message depending on the time period in which the event information is notified. For example, if event information about a traffic accident is notified at night, the M2M service PF 31 may transmit a message to urge vehicles to be notified of the occurrence of the traffic accident to turn on headlights. As for the time period in which the event information is notified, the M2M service PF 31 may determine whether the event information is notified during commute, or may determine whether the time period falls on a day off, a national holiday, a weekday, or consecutive holidays. The M2M service PF 31 may also determine whether the time period falls on the day of an event such as a concert, a sports event, an election, or a fireworks display.

The M2M service PF 31 may determine the distribution message and the distribution policy by using a plurality of pieces of notified event information. For example, when the same event information is notified in a wide range of area, the M2M service PF 31 may include, as the distribution area, the notified wide range of area in which the event information is notified. When a plurality of same event information are transmitted from a specific location, the M2M service PF 31 may control the event information by setting the degree of severity in the event information to a high level.

When different types of event information are notified, the M2M service PF 31 may determine the degree of severity or the like of the event information according to the notified event information. For example, when the M2M service PF 31 has received event information about a traffic accident and event information about a fire, the M2M service PF 1 may determine that a big accident has occurred and may control the event information by setting the degree of severity in the event information to a high level. When the M2M service PF 31 is notified of event information about an injury and event information about a crime, the M2M service PF 31 may determine that a serious crime has occurred and may control the event information by setting the degree of severity in the event information to a high level. When the M2M service PF 31 has received event information about an injury and event information about a fire, the M2M service PF 31 may determine that an emergency accident has occurred and may control the event information by setting the degree of severity in the event information to a high level. When the M2M service PF 31 has received event information about a traffic accident and event information about an injury, the M2M service PF 31 may determine the distribution message indicating that there has been an accident resulting in injury or death and that emergency response measures are required.

While the M2M service PF 31 specifies the distribution message and the distribution policy according to the event information transmitted from the M2M device 11_1, the M2M service PF 31 may also receive user data which is transmitted regularly or irregularly, i.e., at an arbitrary timing, between the M2M device 11_1 and the application server 40. The M2M service PF 31 may analyze the content of the received data and may determine to distribute the distribution message and the distribution policy to be transmitted to the distribution device 26 based on the analysis result.

In this case, when the M2M service PF 31 has received the service policy transmitted from the application server 40, the M2M service PF 31 may determine whether or not the application server 40 is an application server that is permitted to execute the broadcast service via a mobile network. For example, the M2M service PF 31 includes a management table that manages a list of application servers that are permitted to execute the broadcast service. When a service policy is transmitted from an application server, the M2M service PF 31 may determine whether or not the application server which has transmitted the service policy is managed in the management table.

Further, the M2M service PF 31 selects a network for transmitting the distribution message from among a plurality of connected networks. In other words, the M2M service PF 31 selects a network for distributing the distribution message to the M2M devices. The M2M service PF 31 may select a network based on the service policy transmitted from the application server 40. That is, the M2M service PF 31 selects a network that can satisfy the service policy transmitted from the application server 40. For example, the M2M service PF 31 may select a network that can distribute the distribution message to the distribution area determined based on the service policy. The M2M service PF 31 may also select a network that can distribute data to the distribution target device determined based on the service policy.

The M2M service PF 31 may include information about a congestion state of each network, and may select a network with a small amount of communication traffic. FIG. 2 illustrates that the M2M service PF 31 selects the mobile network 25.

The M2M service PF 31 transmits the distribution message and the distribution policy to the distribution device 26 in the selected network. In this case, the M2M service PF 31 may change the message format, coding system, or the like of the distribution message and the distribution policy depending on the selected network.

In this case, the M2M service PF 31 may perform charging according to the distribution policy determined so as to satisfy the service policy. For example, when a wide distribution area is designated as the distribution area determined in the distribution policy, the M2M service PF 31 may charge the application server 40 a rate higher than that when a narrow distribution area is designated as the distribution area.

The distribution device 26 distributes the distribution message to the M2M devices 11_1 to 11_3 based on the distribution policy transmitted from the M2M service PF 31. When a distribution area is set in the distribution policy, the distribution device 26 distributes the distribution message to the M2M devices 11_1 to 11_3 via a base station or the like disposed in the set distribution area. Further, when a distribution target device is set in the distribution policy, the distribution device 26 distributes the distribution message to the M2M devices 11_1 to 11_3 via a base station or the like that communicates with the distribution target device. Since the distribution policy received by the distribution device 26 from the M2M service PF 31 is used to broadcast the distribution message to the M2M devices 11_1 to 11_3, the distribution policy may be referred to as a broadcast parameter.

The distribution device 26 may distribute the distribution message by broadcast distribution such as broadcast communication, multicast communication, or cell broadcast communication. As the multicast communication, for example, MBMS (Multimedia Broadcast Multicast Service) may be used. As the cell broadcast communication, for example, ETWS (Earthquake and Tsunami Warning System) may be used.

After completion of the distribution of the distribution message, the distribution device 26 may transmit a completion notification message to the M2M service PF 31. Further, the M2M service PF 31 may summarize and transmit completion notification messages to the application server 40.

The configuration in which the distribution message and the distribution policy which are determined based on the event notification transmitted from the M2M devices are transmitted to the M2M service PF 31 has been described above. However, the operation of the M2M service PF 31 is not limited to this. For example, the M2M service PF 31 may receive event information about a traffic accident from an information server or the like which summarizes information about the traffic accident. Alternatively, the application server 40 may periodically distribute information about traffic information to the M2M service PF 31. A device that notifies the M2M service PF 31 of the event information may be referred to as, for example, an external device.

When the function for periodically performing a broadcast based on the distribution message and the distribution policy which have been transmitted once is not used in the network, for example, the M2M service PF 31 may repeatedly transmit a distribution message and a distribution policy to the network. This enables the distribution device 26 to execute the broadcast every time the distribution device 26 receives a distribution message and a distribution policy.

Figure 3:
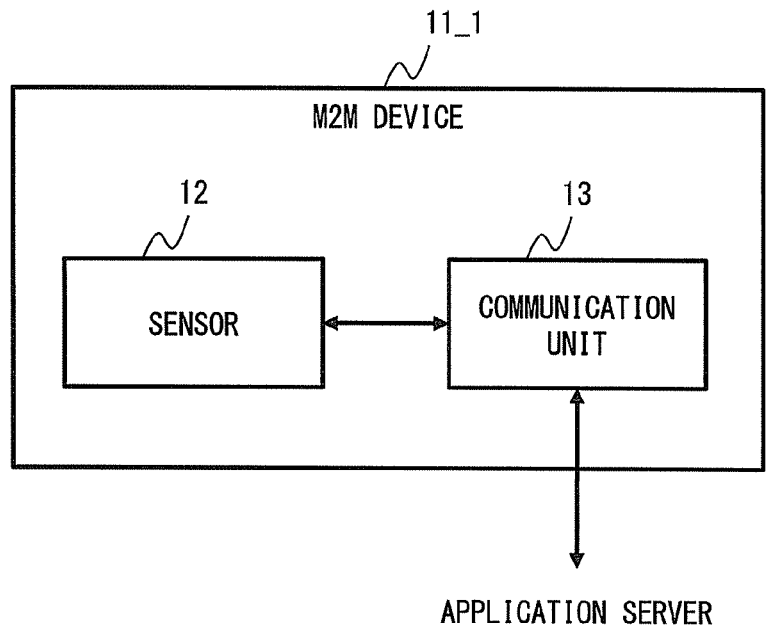
FIG. 3 is a block diagram showing an M2M device according to the second exemplary embodiment.

Next, a configuration example of the M2M device 11_1 will be described with reference to FIG. 3. Note that the M2M devices 11_2 and 11_3 have the same configuration as that of the M2M device 11_1, and thus the detailed description thereof is omitted. The M2M device 11_1 includes a sensor 12 and a communication unit 13. If the M2M device 11_1 is a vehicle, such as a general vehicle, a truck, or a taxi, for example, the sensor 12 detects an operation related to a traffic accident, such as the operation of an airbag as mentioned above. Further, the sensor 12 may collect GPS data indicating the present location of the M2M device 11_1. The sensor 12 outputs the detected or collected information to the communication unit 13.

This figure discloses the configuration in which the M2M device 11_1 includes the sensor 12. However, the sensor 12 may be provided outside of the M2M device 11_1.

The M2M device 11_1 transmits the information output from the sensor 12 to the M2M service PF 31 as an event notification. The communication unit 13 may transmit the event notification to the M2M service PF 31 via a wireless line provided by a mobile carrier, or may transmit the event notification to the M2M service PF 31 via a wireless LAN (Local Area Network), the Internet, or the like.

Figure 4:
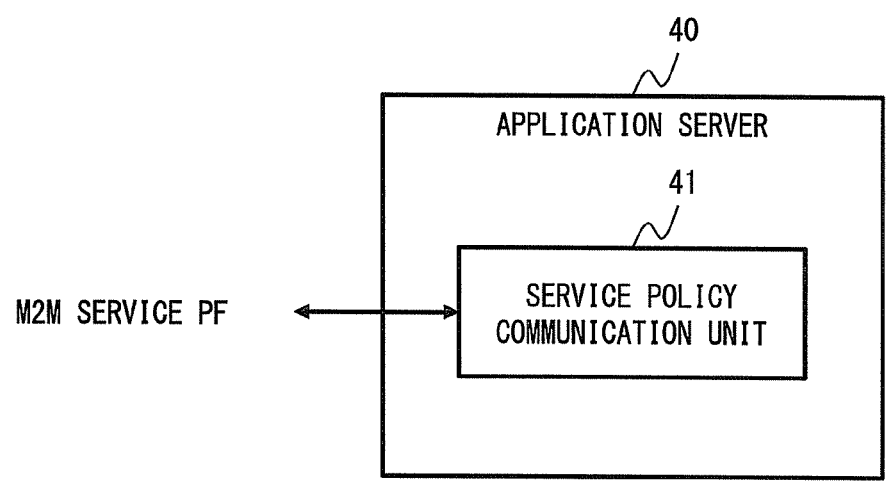
FIG. 4 is a block diagram showing an application server according to the second exemplary embodiment.

Next, a configuration example of the application server 40 will be described with reference to FIG. 4. The application server 40 includes a service policy communication unit 41. The service policy communication unit 41 transmits the held service policy to the M2M service PF 31.

Figure 5:
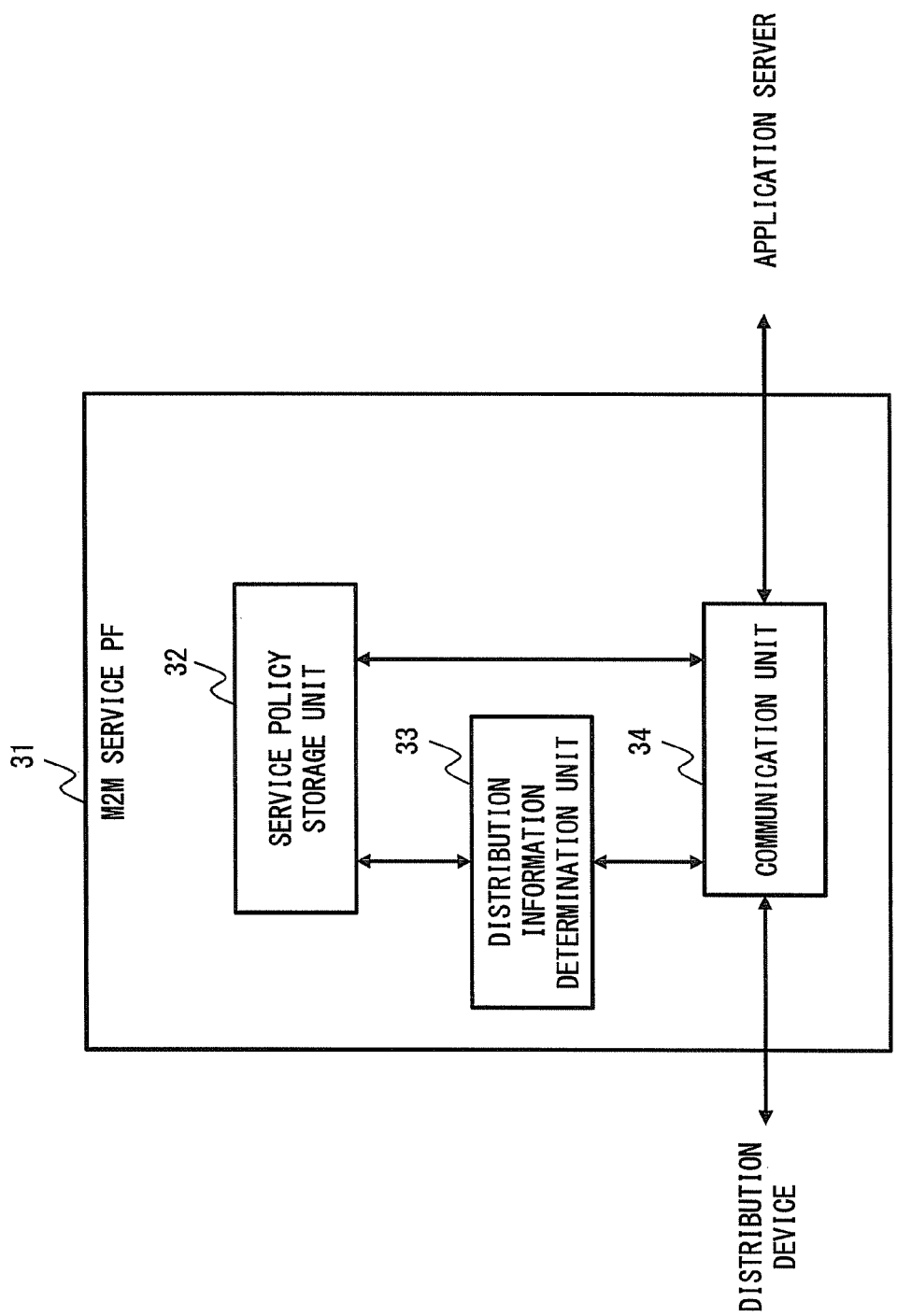
FIG. 5 is a diagram showing an M2M service platform according to the second exemplary embodiment.

Next, a configuration example of the M2M service PF 31 will be described with reference to FIG. 5. The M2M service PF 31 includes a service policy storage unit 32, a distribution information determination unit 33, and a communication unit 34.

The service policy storage unit 32 stores the service policy transmitted from the application server 40 via the communication unit 34. The service policy storage unit 32 may store a plurality of service policies transmitted from different application servers. Further, the service policy storage unit 32 manages the service policies and the event information to be transmitted to the M2M service PF 31, in such a manner that the service policies and the event information are correlated with each other.

The distribution information determination unit 33 receives the event information transmitted from the M2M device 11_1 via the communication unit 34. The distribution information determination unit 33 extracts, from the service policy storage unit 32, the service policy correlated with the received event information. The distribution information determination unit 33 determines the distribution message and the distribution policy that satisfy the service policy extracted from the service policy storage unit 32. Upon receiving a plurality of pieces of event information from the M2M device 11_1, the distribution information determination unit 33 may analyze the plurality of pieces of event information and may extract the service policy related to the event information from the service policy storage unit 32 according to the analysis result.

Further, when the M2M service PF 31 is connected to a plurality of distribution devices disposed in different networks, the distribution information determination unit 33 determines a distribution device for transmitting the determined distribution message and distribution policy. The distribution information determination unit 33 selects a network that can satisfy the extracted service policy. For example, the distribution information determination unit 33 may select a network that can distribute the distribution message to the distribution area determined based on the service policy. The M2M service PF 31 may also select a network that can distribute data to the distribution target device determined based on the service policy.

Furthermore, the M2M service PF 31 may include information about a congestion state in each network, and may select a network with a small amount of communication traffic.

The communication unit 34 communicates with the application server 40 and the distribution device 26. The communication unit 34 receives the service policy transmitted from the application server 40, and outputs the received service policy to the service policy storage unit 32. Further, the communication unit 34 receives the event information transmitted from the M2M device 11_1 via the distribution device 26, and outputs the received event information to the distribution information determination unit 33. In this case, the communication unit 34 may receive the event information transmitted from the M2M device 11_1 via another communication line or the like without involving the distribution device 26. Alternatively, the communication unit 34 may receive event information transmitted from a communication device different from the M2M device 11_1, for example, an external device such as a server device.

The communication unit 34 transmits the distribution message and the distributed policy to the distribution device 26 determined by the distribution information determination unit 33.

Figure 6:
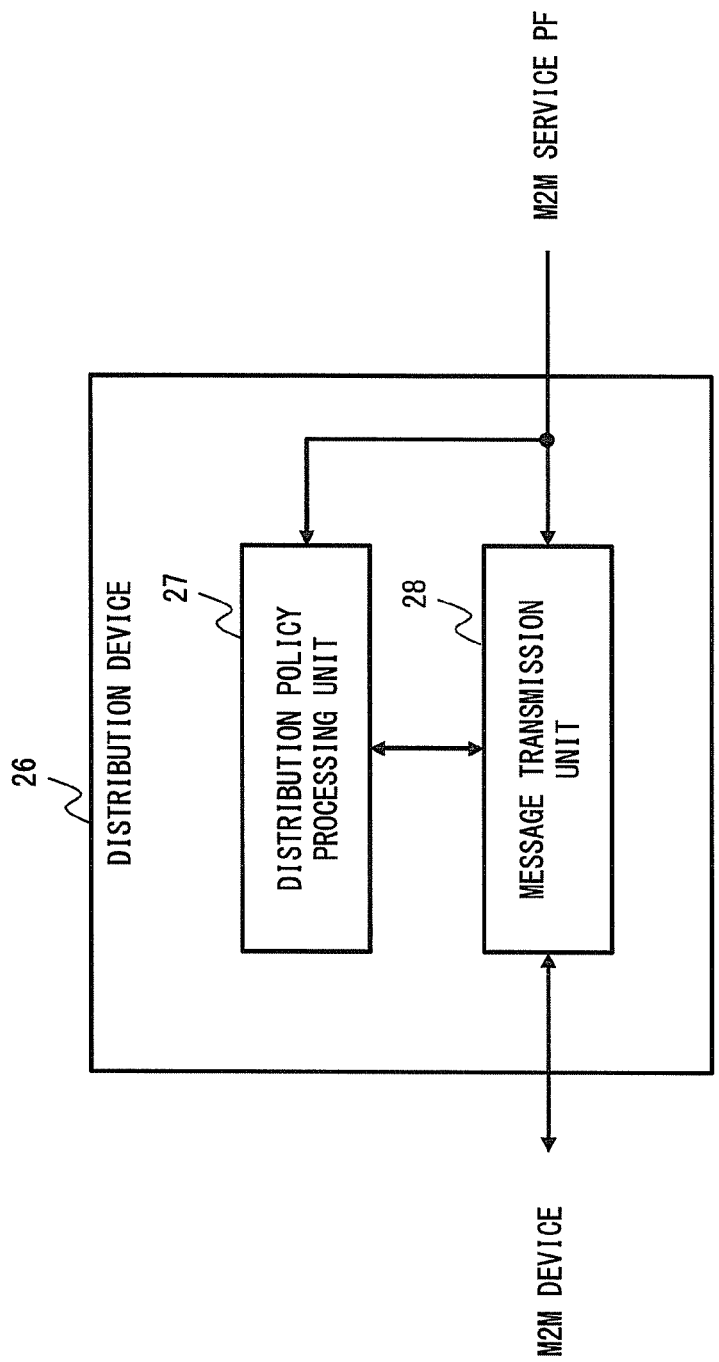
FIG. 6 is a block diagram showing a distribution device according to the second exemplary embodiment.

Next, a configuration example of the distribution device 26 will be described with reference to FIG. 6. The distribution device 26 includes a distribution policy processing unit 27 and a message transmission unit 28.

The distribution policy processing unit 27 receives the distribution policy transmitted from the M2M service PF 31. The distribution policy processing unit 27 determines a distribution destination base station, a relay device, or the like based on, for example, the distribution policy, thereby determining a communication path for the distribution message. The distribution policy processing unit 27 outputs information about the determined communication path to the message transmission unit 28.

The message transmission unit 28 distributes the distribution message received from the M2M service PF 31 to the M2M devices 11_1 to 11_3 via a base station or the like, which communicates with the M2M devices 11_1 to 11_3, based on the information about the communication path output from the distribution policy processing unit 27.

Figure 7:
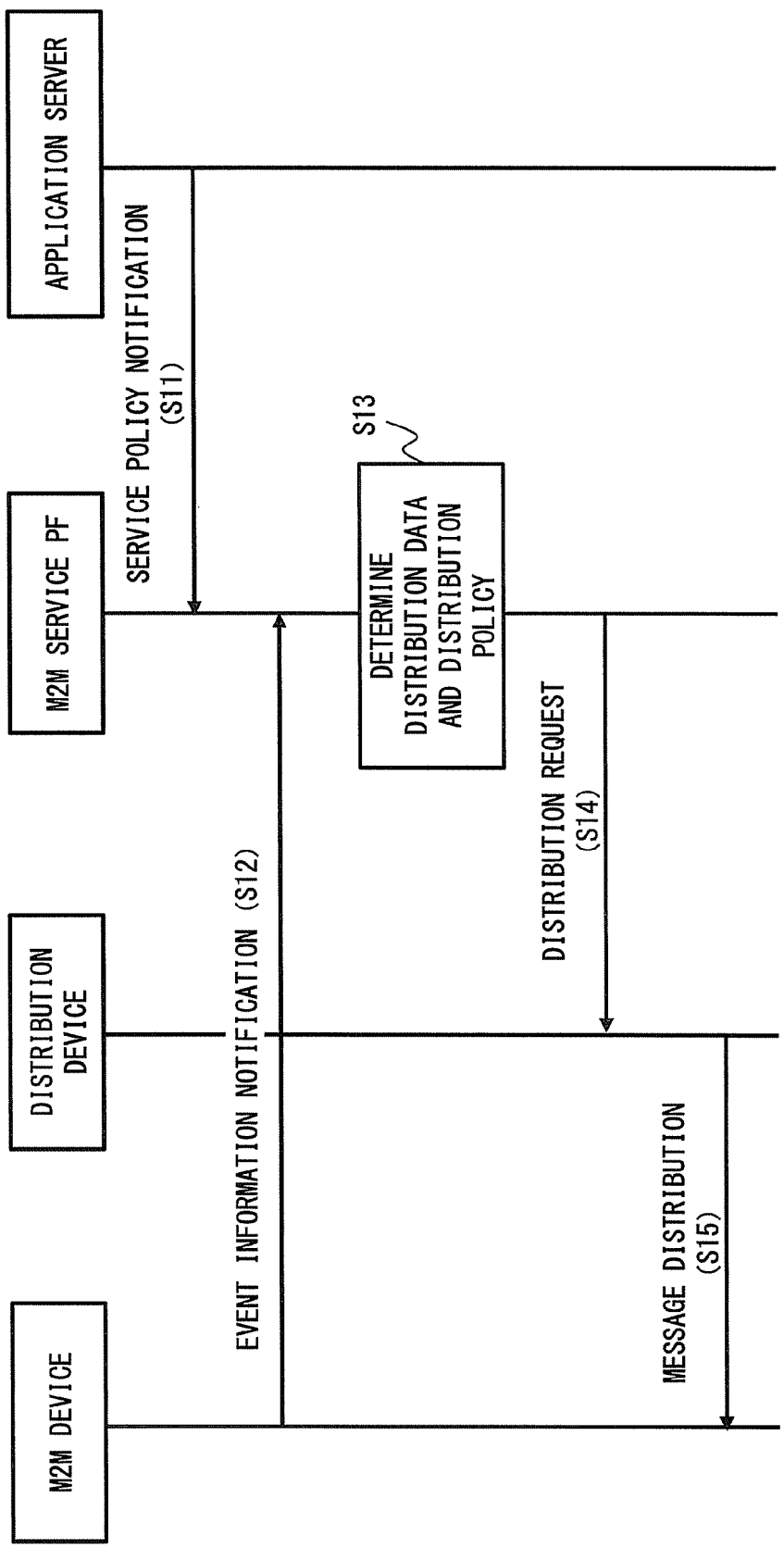
FIG. 7 is a flowchart showing a distribution processing flow according to the second exemplary embodiment.

Next, a distribution processing flow according to the second exemplary embodiment of the present invention will be described with reference to FIG. 7. First, the application server 40 transmits a service policy notification message to the M2M service PF 31 (S11). The service policy notification message includes the service policy determined by the application server 40.

Next, the M2M device 11_1 transmits the event information notification message to the M2M service PF 31 so as to notify, for example, the occurrence of a traffic accident (S12). For example, the M2M device 11_1 transmits, to the M2M service PF 31, the location where the traffic accident has occurred, or the level of severity of the traffic accident. The level of severity of the traffic accident may indicate, for example, the extent of damage.

Next, the M2M service PF 31 determines the distribution message and the distribution policy that satisfy the service policy correlated with the received event information (S13). The M2M service PF 31 determines the distribution message and the distribution policy and selects, from among a plurality of networks, a network that satisfies the service policy.

Next, the M2M service PF 31 transmits a distribution request message including the distribution message and the distribution request policy to the distribution device 26 disposed in the selected network (S14). Next, the distribution device 26 distributes the distribution message included in the distribution request message to the M2M devices 11_1 to 11_3 based on the distribution policy included in the distribution request message transmitted from the M2M service PF 31 (S15). The distribution device 26 distributes the distribution message according to, for example, the distribution area, the distribution device, the distribution period, or the like designated in the distribution policy.

Figure 8:
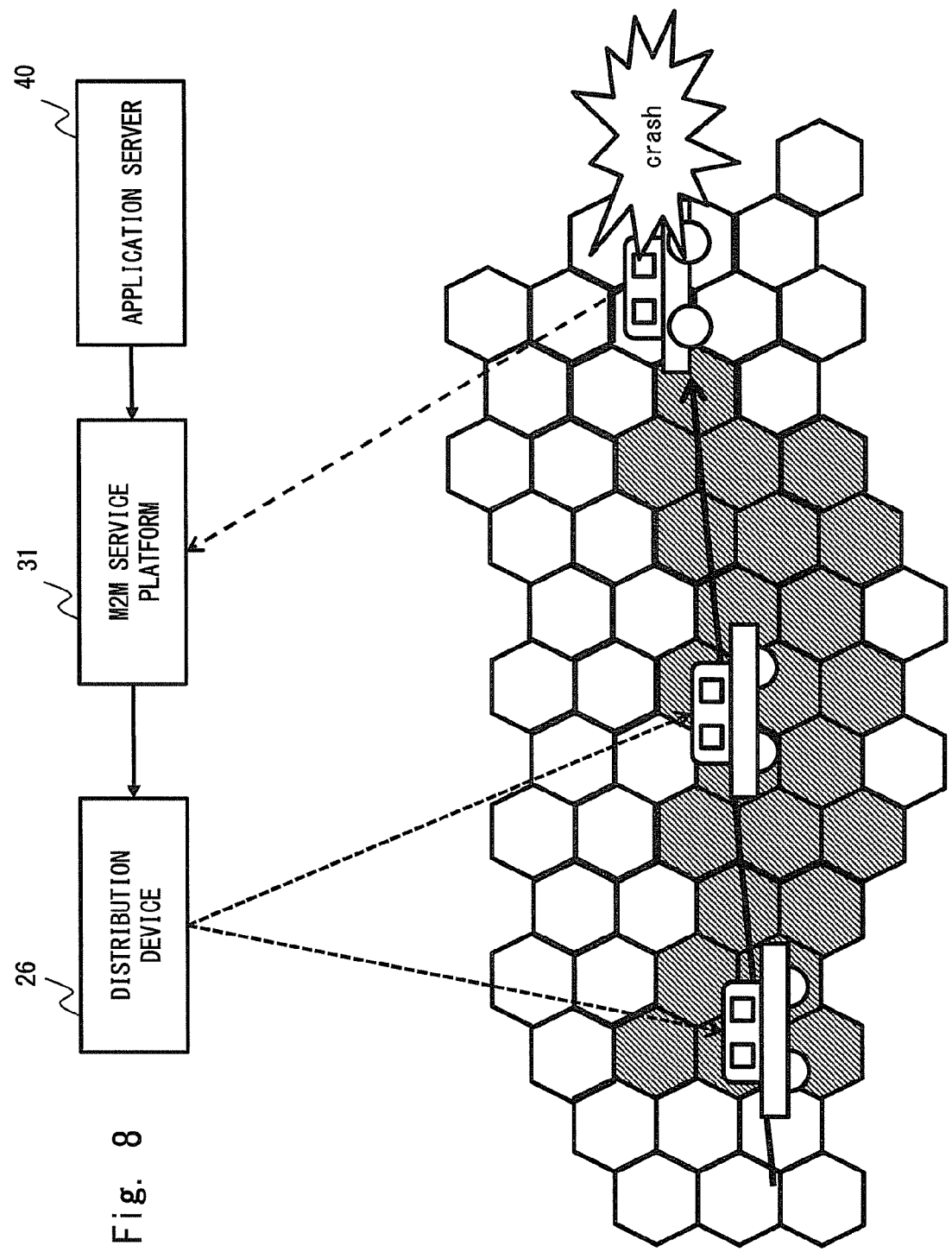
FIG. 8 is a diagram for explaining an outline of services according to the second exemplary embodiment.

Next, an outline of the broadcast service according to the second exemplary embodiment of the present invention will be described with reference to FIG. 8. FIG. 8 illustrates a state in which a vehicle travels from the left to the right. Each hexagonal area represents an area covered by one base station, and indicates, for example, a cell or a sector.

FIG. 8 illustrates a state in which a vehicle on the right side among the three vehicles has caused a traffic accident. In such a case, the vehicle involved in the occurrence of the traffic accident sends a notification about the occurrence of the traffic accident to the M2M service PF 31 as event information. The M2M service PF 31 receives in advance from the application server 40 the service policy which defines that "when the occurrence of a traffic accident is detected, a message to urge vehicles travelling at a distance within one kilometer from the traffic accident site to slow down is distributed for a certain period of time". Therefore, the M2M service PF 31 determines, as the distribution area, an area within a radius of one kilometer from the traffic accident site notified in the event information, and determines the communication devices mounted on the vehicles as distribution target devices. Further, the M2M service PF 31 determines a predetermined message as the message to urge the vehicles to slow down.

The M2M service PF 31 selects the mobile network 25 capable of distributing the distribution message to the distribution area and the distribution target device, and transmits the distribution policy and the distribution message to the distribution device 26 disposed in the selected mobile network 25. Shaded areas in FIG. 8 represent the distribution area determined by the M2M service PF 31.

The distribution device 26 distributes the distribution message to the vehicles traveling in the distribution area. The number of vehicles to which the distribution message is distributed as shown in FIG. 8 is only an example. Vehicles located in the shaded areas can be distribution target vehicles to which the distribution message is distributed.

FIG. 8 illustrates an example in which information is distributed when a traffic accident occurs. Meanwhile, if the occurrence of a traffic jam is detected, or if it is detected that a traffic jam is likely to occur, by analyzing information transmitted from a plurality of vehicles, the M2M service PF 31 may distribute traffic jam information and route guidance information to vehicles which are likely to be involved in the traffic jam.

Further, if information about traveling of an emergency vehicle, such as an ambulance, a police vehicle, or a fire-fighting vehicle, is detected, the M2M service PF 31 may distribute the information about traveling of the emergency vehicle to vehicles traveling to the destination of the emergency vehicle.

Figure 9:
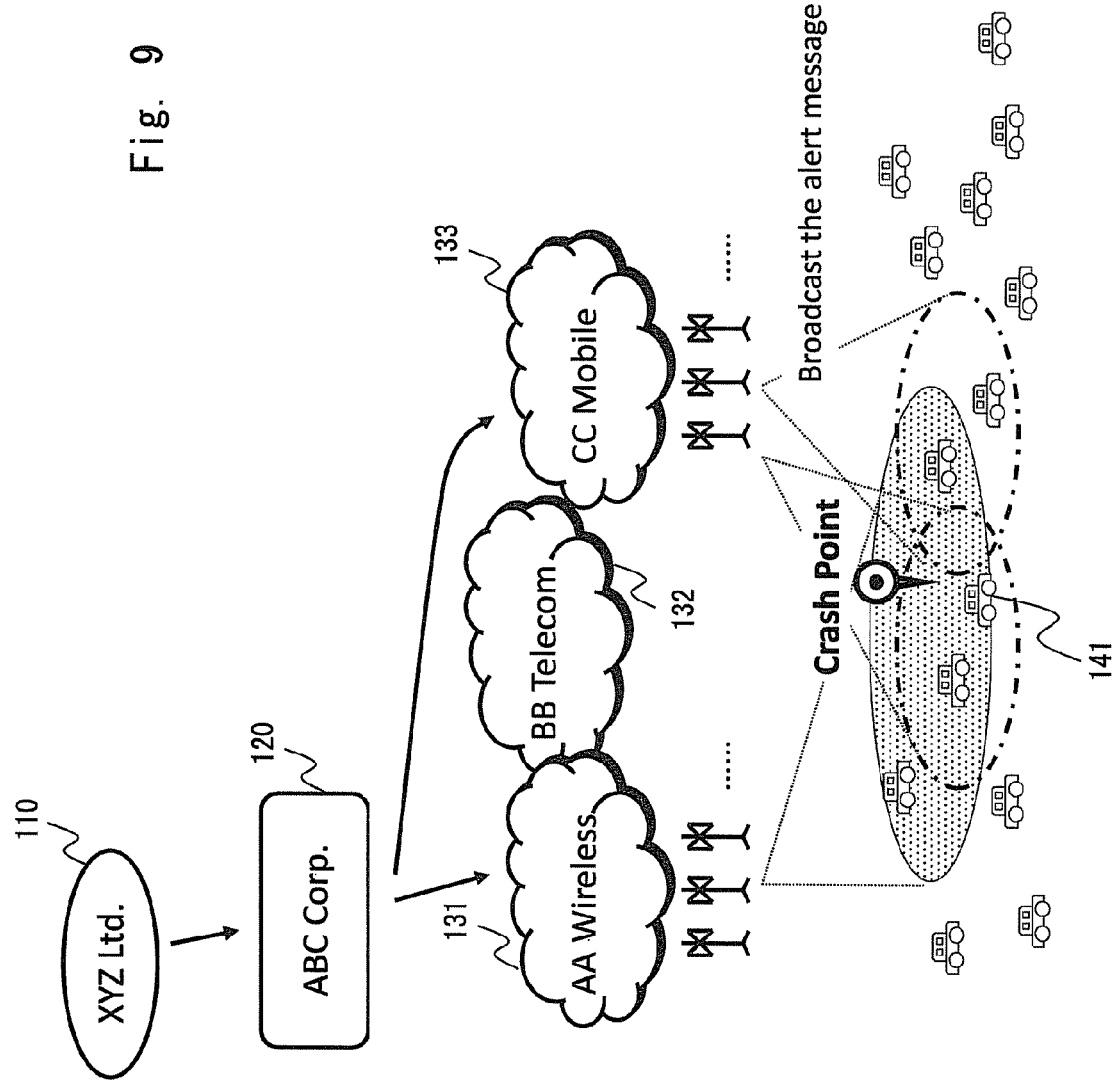
FIG. 9 is a block diagram showing the communication system according to the second exemplary embodiment.
Figure 10:
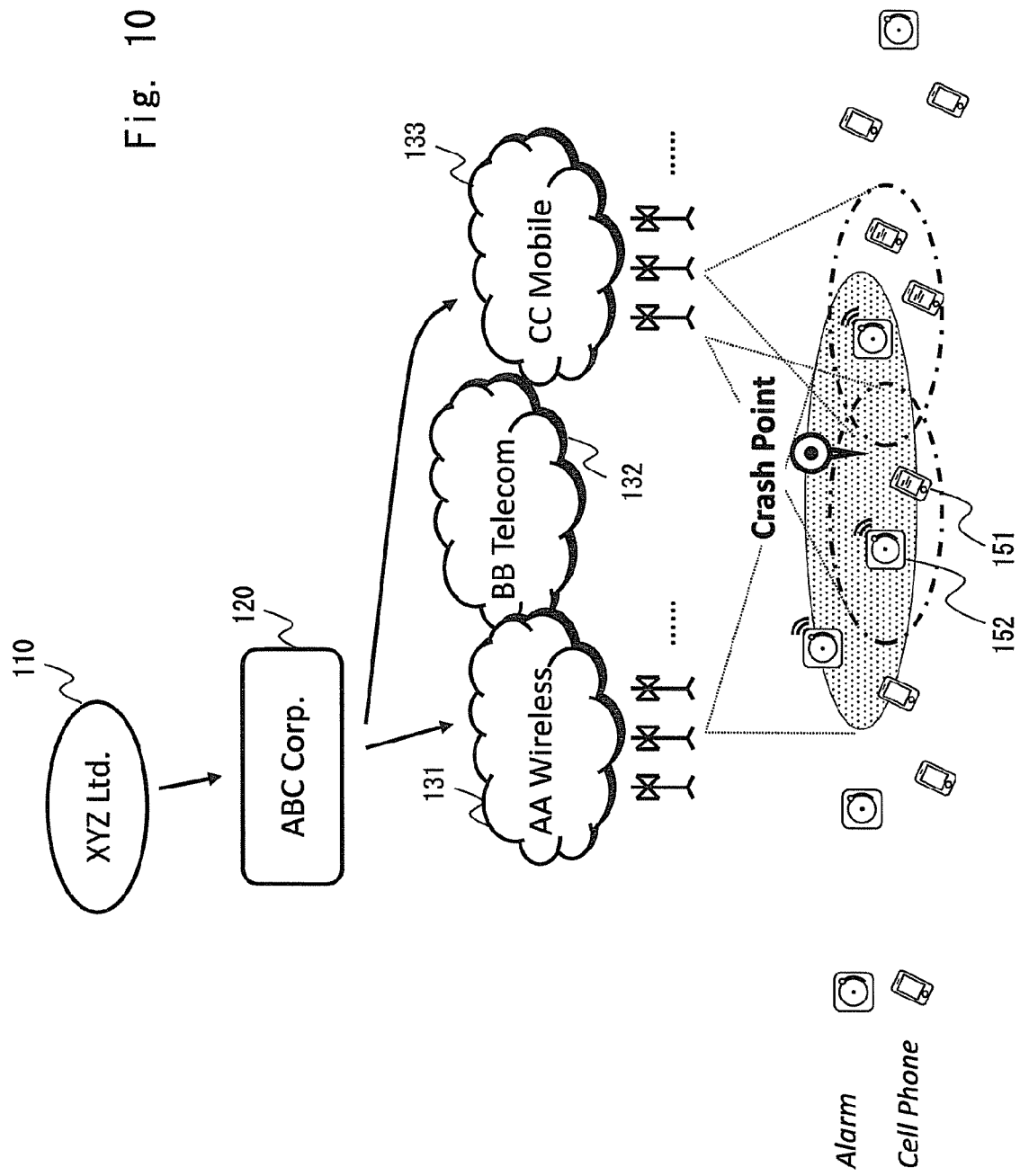
FIG. 10 is a block diagram showing the communication system according to the second exemplary embodiment.

Referring now to FIGS. 9 and 10, an example of network selection in the communication system according to the second exemplary embodiment of the present invention will be described. Referring to FIG. 9, an XYZ Ltd. 110 corresponds to the application server. An ABC Corp. 120 corresponds to the M2M service PF. An AA Wireless 131, a BB Telecom 132, and a CC Mobile 133 indicate that there are a plurality of networks. A vehicle 141 is shown as a specific example of the M2M device.

As shown in FIG. 9, the ABC Corp. 120 selects the AA Wireless 131 and the CC Mobile 133 from among the AA Wireless 131, the BB Telecom 132, and the CC Mobile 133. The AA Wireless 131 and the CC Mobile 133 use a base station device or the like in the respective networks and transmit the distribution message to the vehicle 141 within the area managed by a base station.

FIG. 10 illustrates a mobile phone 151 and an alarm device 152 as the M2M devices. The other components are similar to those shown in FIG. 9. Referring to FIG. 10, the ABC Corp. 120 selects the Wireless 131 and the CC Mobile 133 from among the AA Wireless 131, the BB Telecom 132, and the CC Mobile 133, and the AA Wireless 131 and the CC Mobile 133 use a base station device or the like in the respective networks and transmit the distribution message to the mobile phone 151 and the alarm device 152 within the area managed by the base station.

FIG. 9 illustrates one type of distribution target devices, while FIG. 10 illustrates a plurality of types (for example, two types) of distribution target devices. FIGS. 9 and 10 also illustrate that the M2M service PF can select one or more networks.

As described above, in the communication system according to the second exemplary embodiment of the present invention, a plurality of application servers are connected to the M2M service PF 31. This enables the distribution device 26 in the mobile network 25 to distribute various types of distribution messages to the plurality of communication devices including the M2M devices.

Furthermore, the M2M service PF 31 is connected to a plurality of networks including mobile networks. This configuration enables the M2M service PF 31 to select and distribute a distribution message to an optimum network according to the distribution policy transmitted from the application server 40.

(Third Exemplary Embodiment)

Figure 11:
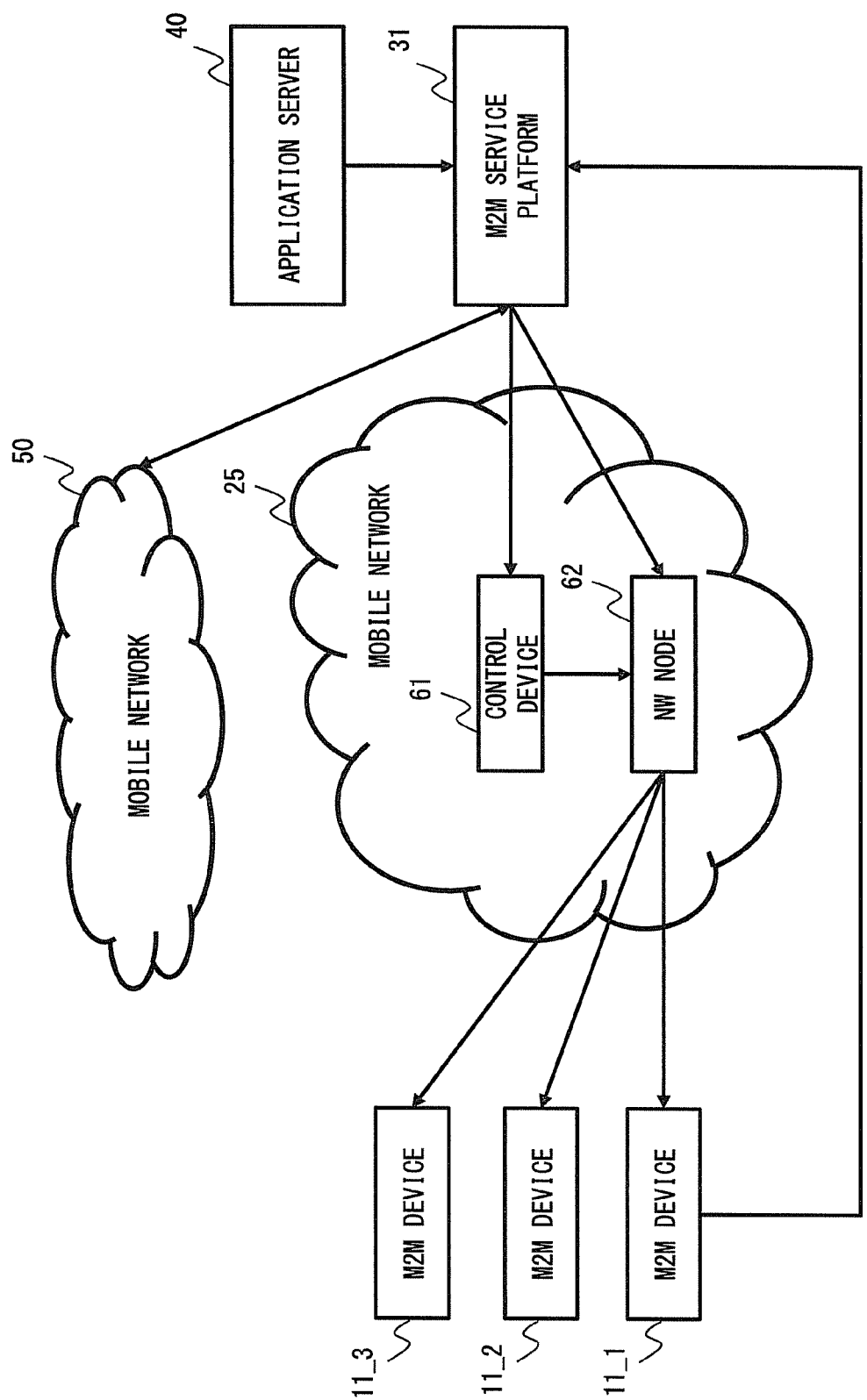
FIG. 11 is a block diagram showing a communication system according to the third exemplary embodiment.

Next, a configuration example of a communication system according to a third exemplary embodiment of the present invention will be described with reference to FIG. 11. The communication system shown in FIG. 11 differs from the communication system shown in FIG. 2 in that the distribution device 26 of the communication system shown in FIG. 2 is replaced by a control device 61 and an NW node 62.

The control device 61 receives the distribution policy transmitted from the M2M service PF 31. For example, the control device 61 determines the distribution area for the distribution message based on the distribution policy, and outputs information about the determined distribution area to the NW node 62. The control device 61 may also output information about a distribution timing, a distribution period, or the like to the NW node 62.

The NW node 62 distributes the distribution message received from the M2M service PF 31 to the M2M devices 11_1 to 11_3. The NW node 62 receives the information about the distribution area from the control device 61, and distributes the distribution message to the M2M device located in the received distribution area. Further, the NW node 62 may distribute the distribution message at the distribution timing instructed by the control device 61.

In this case, the control device 61 may include the distribution policy processing unit 27, which is described above with reference to FIG. 6, and may execute the processing of determining the distribution policy. Further, the NW node 62 may execute the processing of transmitting the distribution message by using the message transmission unit 28 which is described above with reference to FIG. 6.

As described above, the use of the communication system according to the third exemplary embodiment of the present invention makes it possible to process the distribution policy and the distribution message in different devices within the mobile network 25. Accordingly, the processing load of the control device 61 and the NW node 62 can be reduced as compared with a case where the distribution policy and the distribution message are processed in one device.

(Fourth Exemplary Embodiment)

Next, a content of a service policy according to a fourth exemplary embodiment of the present invention will be described. In the first to third exemplary embodiments, the processing in which the M2M service PF 31 determines the distribution message and the distribution policy, which defines a distribution area and the like, according to the service policy acquired from the application server 40 has been described. On the other hand, in the fourth exemplary embodiment, an example in which the service policy includes the distribution policy, the distribution message, and the like will be described. Specifically, the service policy includes event information, and a distribution message and a distribution policy which correspond to the event information. In other words, when a notification about event information, such as traffic accident information, is transmitted, the application server 40 preliminarily determines the distribution policy, such as the distribution message to be distributed and the area for distributing the distribution message, and transmits the determined distribution message and distribution policy to the M2M service PF 31 as the service policy.

The M2M service PF 31 stores the service policy, which is transmitted from the application server 40, into the service policy storage unit 32.

Upon receiving event information from, for example, the M2M device 11_1, the M2M service PF 31 transmits, to the distribution device 26, the distribution message and the distribution policy which are associated with the event information.

Thus, upon receiving the event information, the M2M service PF 31 may transmit, to the distribution device 26, the distribution message and the distribution policy which are determined by the application server 40.

In this case, the distribution message and the distribution policy may be set for each event information transmitted from the M2M device 11_1, or may be set so as to correspond to a plurality of pieces of event information.

(Fifth Exemplary Embodiment)

Figure 12:
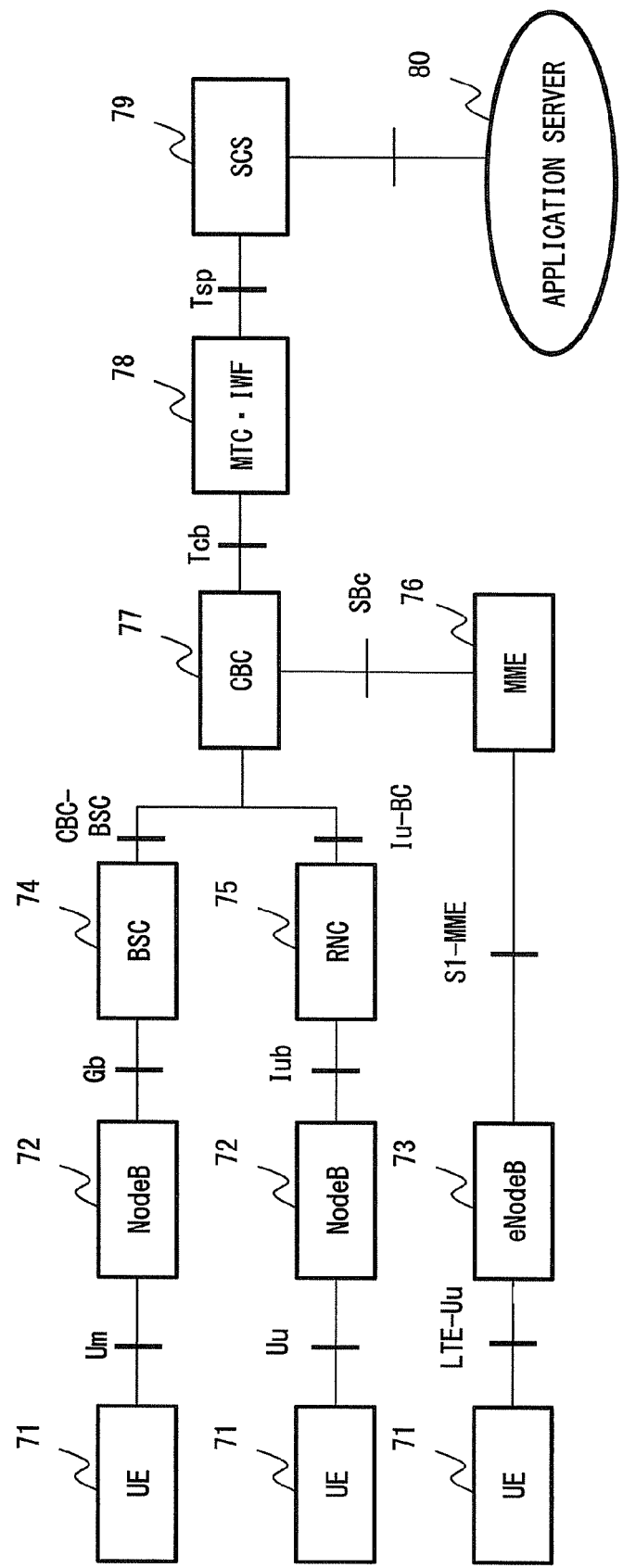
FIG. 12 is a block diagram showing a communication system according to a fifth exemplary embodiment.

Next, a configuration example of a mobile network according to a fifth exemplary embodiment of the present invention will be described with reference to FIG. 12. FIG. 12 illustrates an example in which a mobile network specified in 3GPP (3rd Generation Partnership Project) is used by a mobile carrier. The mobile network shown in this figure includes a UE (User Equipment) 71, a NodeB 72, an eNodeB 73, a BSC (Base Station Controller) 74, an RNC (Radio Network Controller) 75, an MME (Mobility Management Entity) 76, a CBC (Cell Broadcast Center) 77, an MTC-IWF (Interworking Function) 78, an SCS (Service Capability Server) 79, and an application server 80.

The SCS 74 corresponds to the M2M service platform PF. The MTC-IWF 78 corresponds to the distribution device 26 or the control device 61. Node devices other than the UE 71 correspond to the distribution device 26 or the NW node 62.

The UE 71 is a mobile communication device. The NodeB 72 and the eNodeB 73 are base station devices. More particularly, the eNodeB 73 is a base station device used in the LTE. The MME 76 mainly performs mobility management of the UE 71. The BSC 74 and the RNC 75 are devices that control the NodeB 72. The CBC 77 is a device used to execute the cell broadcast. The SCS 79 is a communication node which is provided to communicate with the application server 80 and receives the service policy from the application server 80. The SCS 79 outputs the distribution policy to the MTC-IWF 78 as a control message.

The MTC IWF 78 specifies the distribution area for the distribution message based on the distribution policy transmitted from the SCS 79.

The symbols "Um", "Uu", "LTE-Uu", "Gb", "Iub", "CBC-BSC", "Iu-BC", "S1-MME", "SBc", "Tcb", and "Tsp" shown in this figure represent the names of interfaces between devices.

As described above, the use of the mobile network according to the fourth exemplary embodiment of the present invention makes it possible to distribute the distribution message to a desired area of the application server based on the information about the distribution policy transmitted from the SCS 79, even when the network specified in the 3GPP is used.

(Sixth Exemplary Embodiment)

Figure 13:
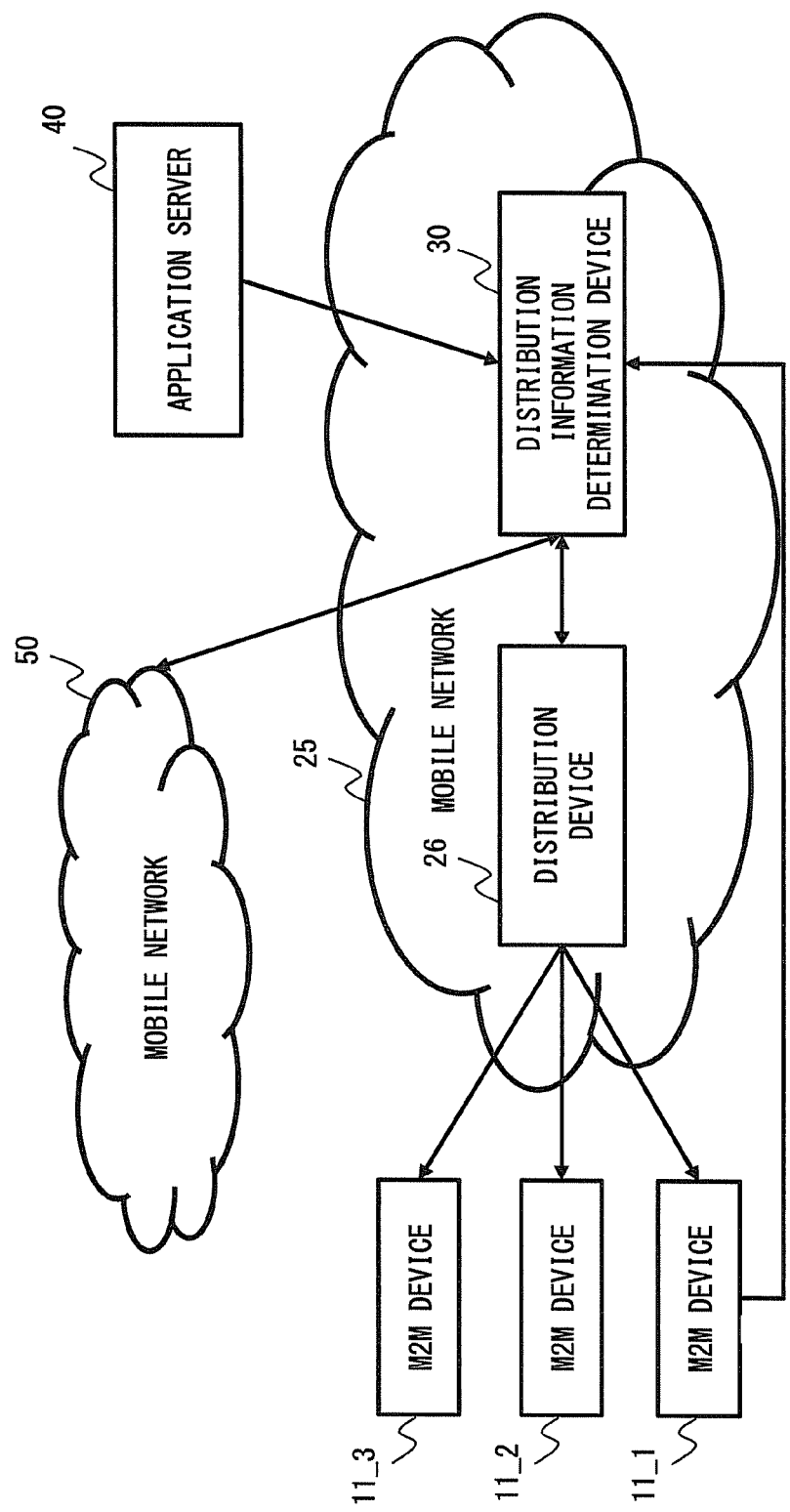
FIG. 13 is a block diagram showing a communication system according to a sixth exemplary embodiment.

Next, a configuration example of a communication system according to a sixth exemplary embodiment of the present invention will be described with reference to FIG. 13. While FIG. 2 illustrates the configuration in which the M2M service PF 31 corresponding to the distribution information determination device 30 is located outside of the mobile network 25, FIG. 13 illustrates a configuration in which the distribution information determination device 30 is located within the mobile network 25. The distribution information determination device 30 located within the mobile network 25 may be, for example, the MTC IWF 78, when the mobile network 25 is specified in the 3GPP.

Figure 14:
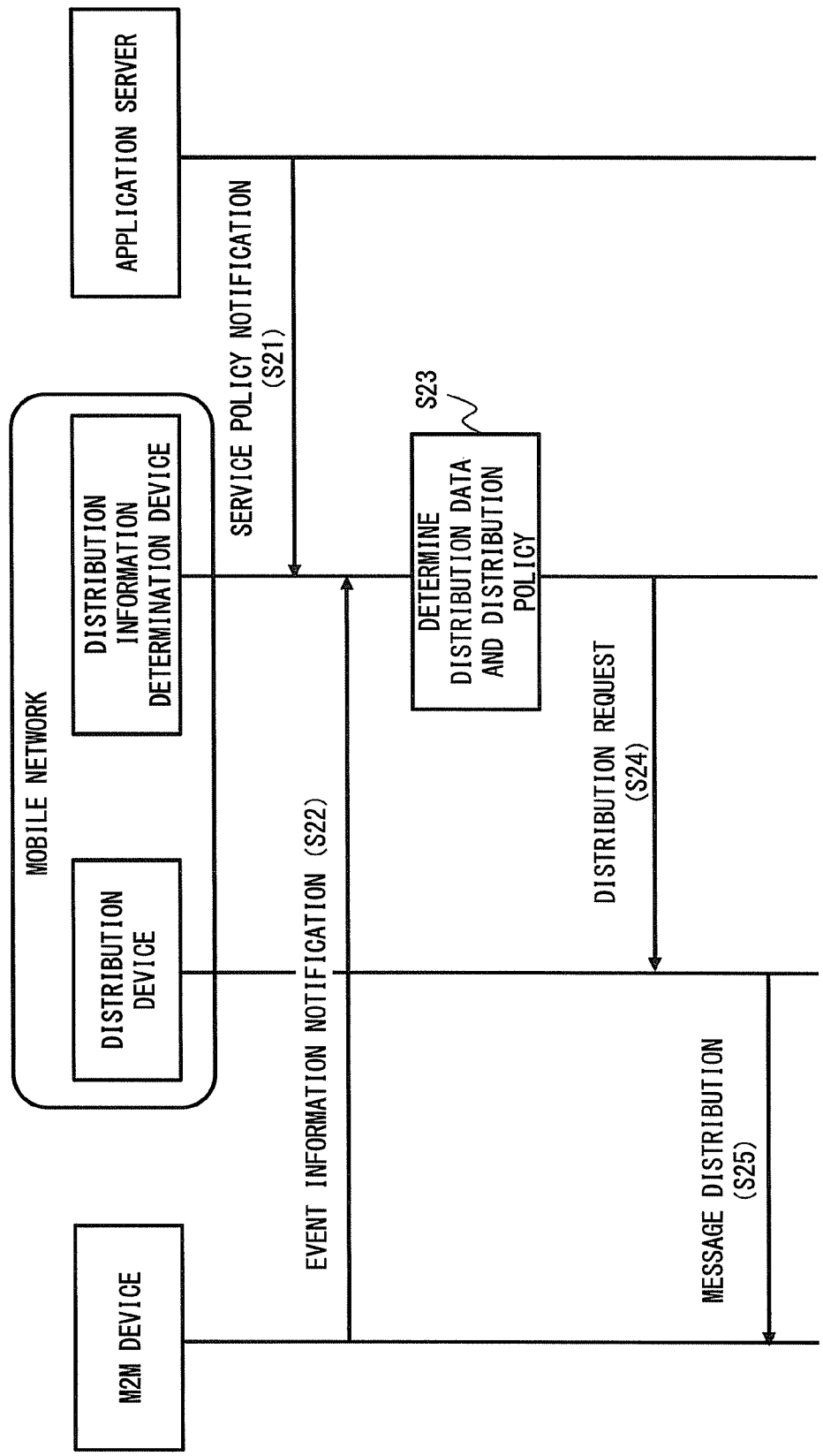
FIG. 14 is a flowchart showing a distribution processing flow according to the sixth exemplary embodiment.

Next, a distribution processing flow according to the sixth exemplary embodiment of the present invention will be described with reference to FIG. 14. A message according to steps S21 to S25 is similar to that according to steps S11 to S15 shown in FIG. 7, and thus the detailed description thereof is omitted. FIG. 14 differs from FIG. 7 in that an interface specified in the mobile network is used as an interface between the distribution device 26 and the distribution information determination device 30. An interface specified in the 3GPP, for example, may be used for the distribution request message transmitted between the distribution device 26 and the distribution information determination device 30. In this regard, in FIG. 7, an interface used to communicate user data may be used as an interface between the distribution device 26 and the M2M service PF 31, instead of being used as an interface with which the control message is transmitted in the mobile network 25.

(Seventh Exemplary Embodiment)

Figure 15:
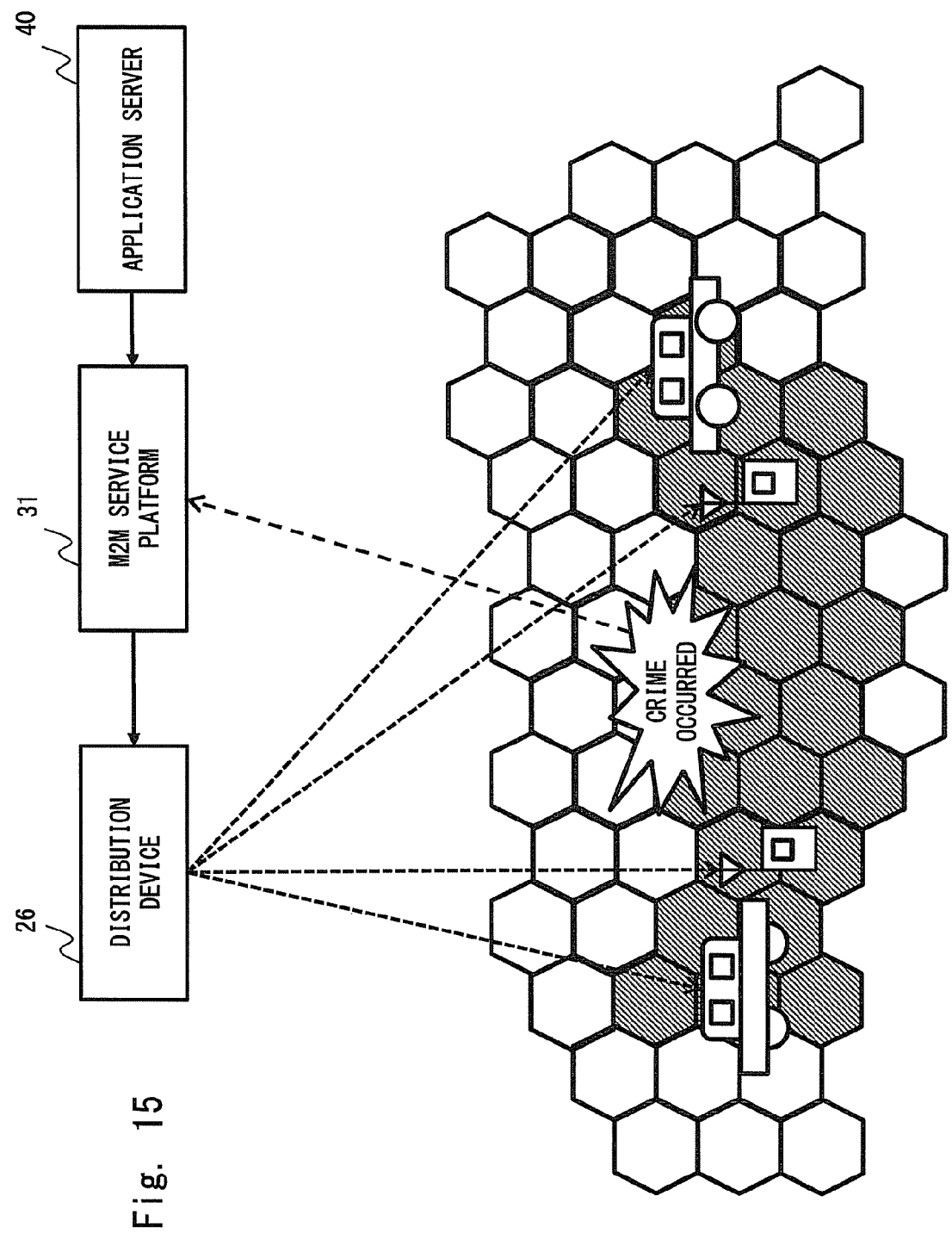
FIG. 15 is a diagram for explaining an application service according to a seventh exemplary embodiment.

Next, examples of the application servers and M2M devices which are different from those of the second exemplary embodiment will be described. In the second exemplary embodiment, each application server is described as being a server managed by a company that provides a broadcast service of distributing information relating to a traffic accident. In addition to this, as shown in FIG. 15, the application server may be a server managed by a company that provides a service of sending a notification about crime occurrence information to communication devices owned by users located in the vicinity of an area where a crime has occurred. For example, when the occurrence of a crime is detected, the application server 40 may transmit, to the M2M service PF 31, a service policy that the crime occurrence information is transmitted to communication devices owned by children located in the vicinity of the area where the crime has occurred, and also to communication devices owned by their parents. In order to achieve such a service, the M2M devices may work in cooperation with a device, such as a security buzzer, and when the security buzzer is used, the M2M devices may transmit information about the occurrence of the crime to the M2M service PF 31 as event information.

The case where a crime has occurred as shown in FIG. 15 can be replaced by a case where a fire has occurred. When the occurrence of a fire is detected, the application server 40 may predict an area damaged due to the occurrence of the fire, and may transmit, to the M2M service PF 31, a service policy that a notification about fire occurrence information is sent to communication devices located in the damaged area. For example, the M2M service PF 31 may determine a distribution policy that a distribution message indicating an evacuation advisory is distributed to mobile phone terminals and the like and a distribution message indicating that it is prohibited to approach the fire scene is distributed to communication devices mounted on vehicles.

Figure 16:
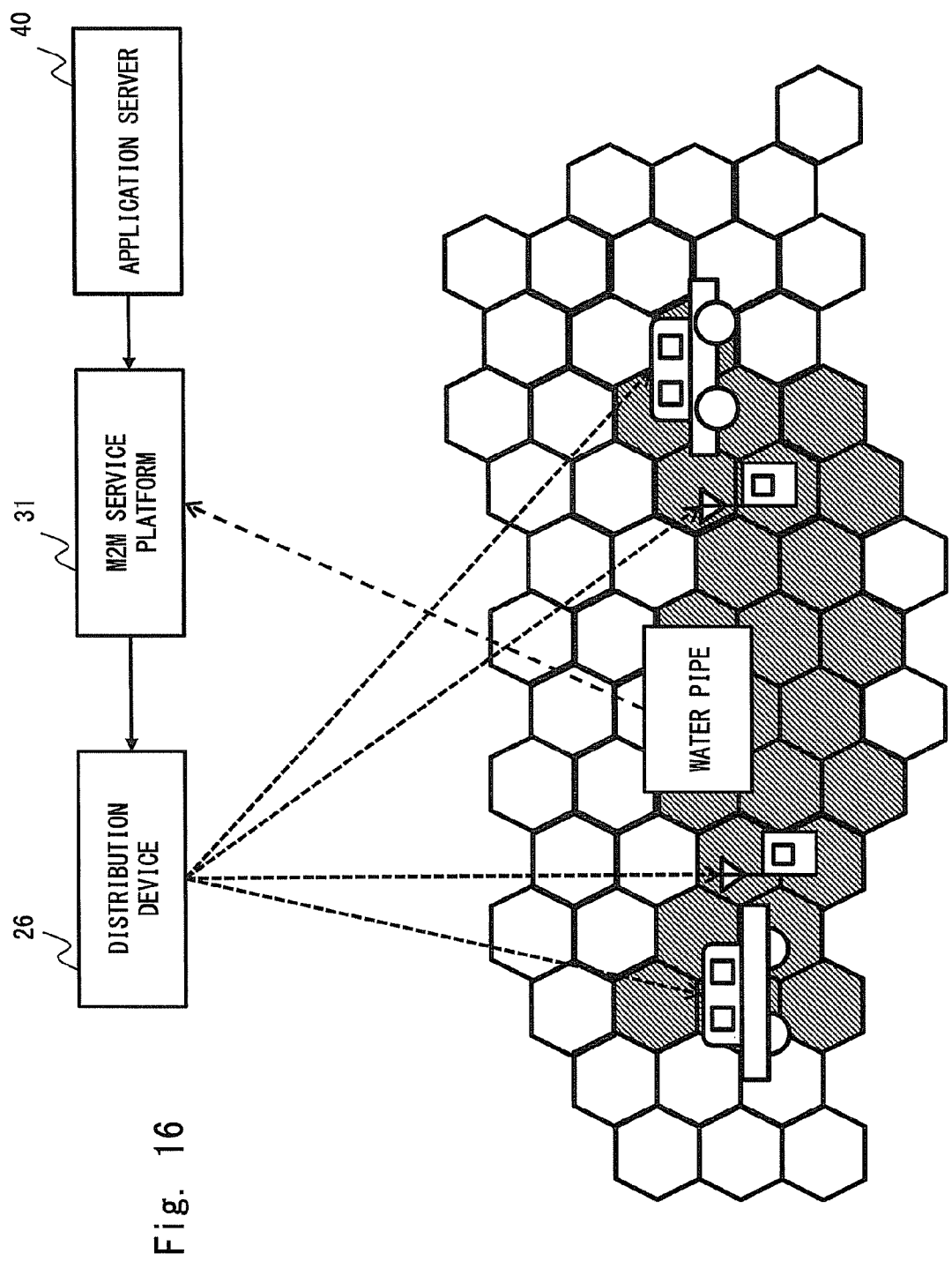
FIG. 16 is a diagram for explaining an application service according to the seventh exemplary embodiment.

The application server may also be a server managed by a company that manages water. For example, as shown in FIG. 16, when the application server 40 is notified of a water pipe rupture from a leakage sensor of a water pipe, the application server 40 may distribute information about the occurrence of a water leakage to communication devices located in the vicinity of the ruptured water pipe, and may also transmit, to the M2M service PF 31, the service policy to instruct the communication devices to control a water valve.

Figure 17:
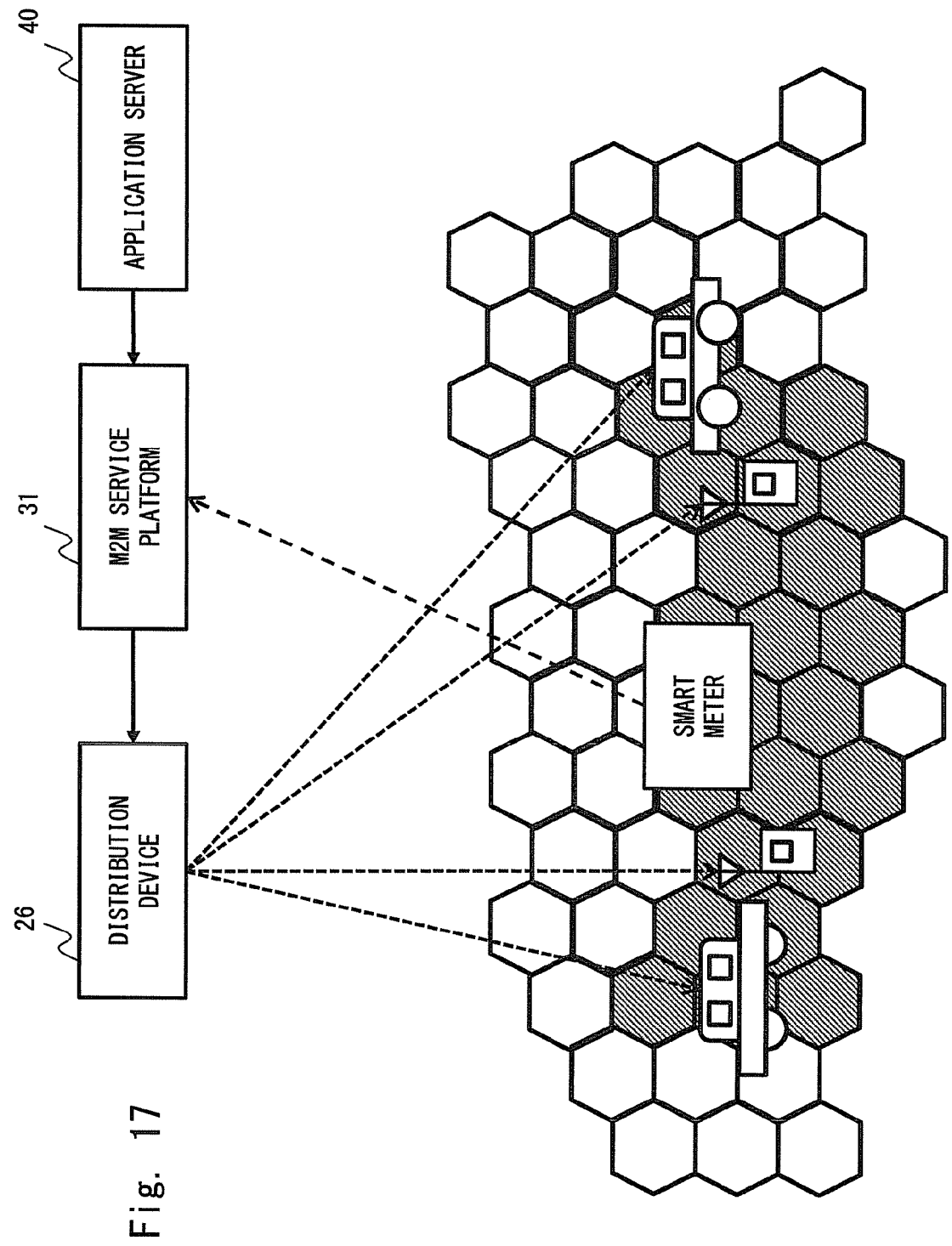
FIG. 17 is a diagram for explaining an application service according to the seventh exemplary embodiment.

The application server may also be a server managed by a company that performs a smart grid control. For example, as shown in FIG. 17, when a rapid change in voltage of a specific smart meter is detected, the application server 40 may transmit, to the M2M service PF 31, a service policy that a message about voltage suppression is distributed to communication devices located in the vicinity of the smart meter.

As described above, the use of the communication systems described in the first to sixth exemplary embodiments makes it possible to distribute information according to various services. At this time, the M2M service PF 31 is connected to a plurality of application servers and is disposed between the network and the application servers, which eliminates the need for the network to support a connection, for example, each time a new application server is added. Furthermore, since the M2M service PF 31 also executes the authentication processing, setting changes on the network side are minimized and information can be distributed according to various services.

Although the present invention is described as a hardware configuration in the above exemplary embodiments, the present invention is not limited to this. According to the present invention, the processing of the distribution information determination device can also be implemented by causing a CPU (Central Processing Unit) to execute a computer program.

In the above-mentioned examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

Note that the present invention is not limited to the above exemplary embodiments, and can be modified as appropriate without departing from the scope of the invention.

While the present invention has been described above with reference to exemplary embodiments, the present invention is not limited to the above exemplary embodiments. The configuration and details of the present invention can be modified in various ways which can be understood by those skilled in the art within the scope of the invention.

This application is based upon and claims the benefit of priority from Japanese patent application No. 2013-50331, filed on Mar. 13, 2013, the disclosure of which is incorporated herein in its entirety by reference.

REFERENCE SIGNS LIST

10_1 COMMUNICATION DEVICE
10_2 COMMUNICATION DEVICE
10_3 COMMUNICATION DEVICE
11_1 M2M DEVICE
11_2 M2M DEVICE
11_3 M2M DEVICE
12 SENSOR
13 COMMUNICATION UNIT
20 NETWORK
21 NETWORK OPERATOR DEVICE
25 MOBILE NETWORK
26 DISTRIBUTION DEVICE
27 DISTRIBUTION POLICY PROCESSING UNIT
28 MESSAGE TRANSMISSION UNIT
30 DISTRIBUTION INFORMATION DETERMINATION DEVICE
31 M2M SERVICE PF
32 SERVICE POLICY STORAGE UNIT
33 DISTRIBUTION INFORMATION DETERMINATION UNIT
34 COMMUNICATION UNIT
40 APPLICATION SERVER
40_1 APPLICATION SERVER
40_2 APPLICATION SERVER
40_3 APPLICATION SERVER
41 SERVICE POLICY COMMUNICATION UNIT
50 MOBILE NETWORK
61 CONTROL DEVICE
62 NW NODE

71 UE
72 NodeB
73 eNodeB
74 BSC
75 RNC
76 MME
77 CBC
78 MTC IWF
79 SCS
80 APPLICATION SERVER

The invention claimed is:

1. A communication system, comprising:
a plurality of network operator devices disposed in a plurality of networks managed by at least one carrier; and
a distribution information determination device comprising at least one processor and being disposed between the plurality of network operator devices and a plurality of application servers configured to provide an application service via at least one of the plurality of networks, the distribution information determination device including a service policy determined by the plurality of application servers, wherein
the processor of the distribution information determination device is configured to:
receive, the service policy transmitted from the plurality of application servers in advance of receiving event information transmitted from an external device;
determine, upon receiving the event information, and based on the service policy and the event information, a distribution message and a distribution policy;
convert, when methods for determining the distribution message and the distribution policy differ for at least two of the plurality of networks, the distribution message and the distribution policy into one or more distribution message data formats and one or more distribution policy data formats, each distribution message format and each distribution policy data format defined by one or more of the plurality of networks; and
transmit, to at least one of the plurality of network operator devices satisfying the service policy, the distribution message and the distribution policy, or the one or more distribution message data formats and the one or more distribution message policy data formats, and
the at least one of the plurality of network operator devices is configured to distribute the distribution message or the one or more distribution message data formats to a plurality of communication devices based on the distribution policy or the one or more distribution policy data formats transmitted from the distribution information determination device, wherein the external device comprises at least one of the plurality of communication devices.

2. The communication system according to claim 1, wherein the service policy is one of a service content and a service specification determined by the plurality of application servers.

3. The communication system according to claim 1, wherein the distribution policy includes at least one of a distribution area, a distribution target communication device, a degree of priority, and a distribution period.

4. The communication system according to claim 1, wherein the event information includes at least one of a degree of severity of an event occurred, a location of the event occurred, a time zone of the event occurred, and a number of events occurred.

5. The communication system according to claim 1, wherein the distribution information determination device is configured to receive the event information transmitted from the plurality of communication devices that perform communication via the network.

6. The communication system according to claim 1, wherein the distribution information determination device includes an information table that manages the event information, and the distribution message and the distribution policy which correspond to the event information.

7. The communication system according to claim 1, wherein the distribution information determination device is disposed in a network of the plurality of networks managed by the carrier.

8. The communication system according to claim 1, wherein the distribution information determination device is configured to determine whether or not the distribution message is allowed to be distributed according to the event information, and when the distribution information determination device determines that the distribution message is allowed to be distributed, the distribution information determination device is configured to transmit the distribution message and the distribution policy to at least one of the network operator devices.

9. The communication system according to claim 1, wherein the distribution information determination device is configured to analyze user data transmitted at an arbitrary timing from the plurality of communication devices to the plurality of application servers, and to transmit the distribution message and the distribution policy to at least one of the network operator devices according to a result of the analysis.

10. The communication system according to claim 1, wherein when a change of state in an ambient environment of the plurality of communication devices is detected by the plurality of communication devices or a sensor that detects the change of state, the plurality of communication devices are configured to transmit the event information to the distribution information determination device.

11. The communication system according to claim 1, wherein each of the plurality of communication devices is one of a mobile phone, a terminal device used in wireless local area network (LAN) communication, and a terminal device used in near field communication.

12. A distribution information determination device disposed between a plurality of network operator devices and a plurality of application servers configured to provide an application service via a plurality of networks managed by at least one carrier, the plurality of network operator devices being disposed in the network, the distribution information determination device comprising:
an information storage unit comprising memory that includes a service policy determined by the plurality of application servers;
a distribution information determination unit comprising at least one processor configured to execute computer-executable instructions to:
receive, the service policy in advance of receiving event information transmitted from an external device;
determine, upon receiving the event information, and based on the service policy and the event information, a distribution message and a distribution policy;
convert, when methods for determining the distribution message and the distribution policy differ for at least two of the plurality of networks, the distribution message and the distribution policy into one or more distribution message data formats and one or more distribution policy data formats, each distribution message data format and each distribution policy data format defined by one or more of the plurality of networks; and transmit, to at least one of the plurality of network operator devices, the distribution message and the distribution policy, or the one or more distribution message data formats and the one or more distribution message policy data formats, for distribution to a plurality of communication devices based on the distribution policy or the one or more distribution policy message policy data formats, wherein the external device comprises at least one of the plurality of communication devices.

13. A communication method used in a distribution information determination device disposed between a plurality of network operator devices and a plurality of application servers configured to provide an application service via a plurality of networks managed by at least one carrier, the plurality of network operator devices being disposed in at least one of the plurality of networks, the communication method comprising:

receiving, a service policy in advance of receiving event information transmitted from an external device, determining, upon receiving the event information, and based on the service policy and the event information, a distribution message and a distribution policy, converting, when methods for determining the distribution message and the distribution policy differ for at least two of the plurality of networks, the distribution message and the distribution policy into one or more distribution message data formats and one or more distribution policy data formats, each distribution message data format and each distribution policy format defined by one or more of the plurality of networks; and transmitting, to at least one of the plurality of network operator devices satisfying the service policy, the distribution message and distribution policy, or the one or more distribution message data formats and the one or more distribution message policy formats to at least one of the plurality of network operator devices configured to distribute the distribution message or the one or more distribution message formats to a plurality of communication devices based on the distribution policy or the one or more distribution policy message formats, wherein the external device comprises at least one of the plurality of communication devices.

14. The communication method of claim 13, wherein the distribution policy includes at least one of a distribution area, a distribution target communication device, a degree of priority, and a distribution period.

15. The communication method of claim 13, wherein the event information includes at least one of a degree of severity of an event occurred, a location of the event occurred, a time zone of the event occurred, and a number of events occurred.

16. A tangible, non-transitory computer readable medium storing a program that, when executed by a computer, cause the computer to perform a method, comprising:

receiving, a service policy in advance of receiving event information transmitted from an external device, determining, upon receiving the event information, and based on the service policy and the event information, a distribution message and a distribution policy, converting, when methods for determining the distribution message and the distribution policy differ for at least two of a plurality of networks including a plurality of network operator devices, the distribution message and the distribution policy into one or more distribution message data formats and one or more distribution policy data formats, each distribution message data format and each distribution policy data format defined by one or more of the plurality of networks; and transmitting, to at least one of the plurality of network operator devices satisfying a service policy, the distribution message and distribution policy, or the one or more distribution message data formats and the one or more distribution message policy formats to at least one of the plurality of network operator devices configured to distribute the distribution message or the one or more distribution message formats to a plurality of communication devices based on the distribution policy or the one or more distribution policy message formats, wherein the external device comprises at least one of the plurality of communication devices.

\* \* \* \* \*